July 11, 1944.　　　N. M. MARSILIUS　　　2,353,480
MILLING MACHINE
Filed Aug. 28, 1941　　　19 Sheets-Sheet 1

Inventor
NEWMAN M. MARSILIUS
By John A. Hanrahan
Attorney

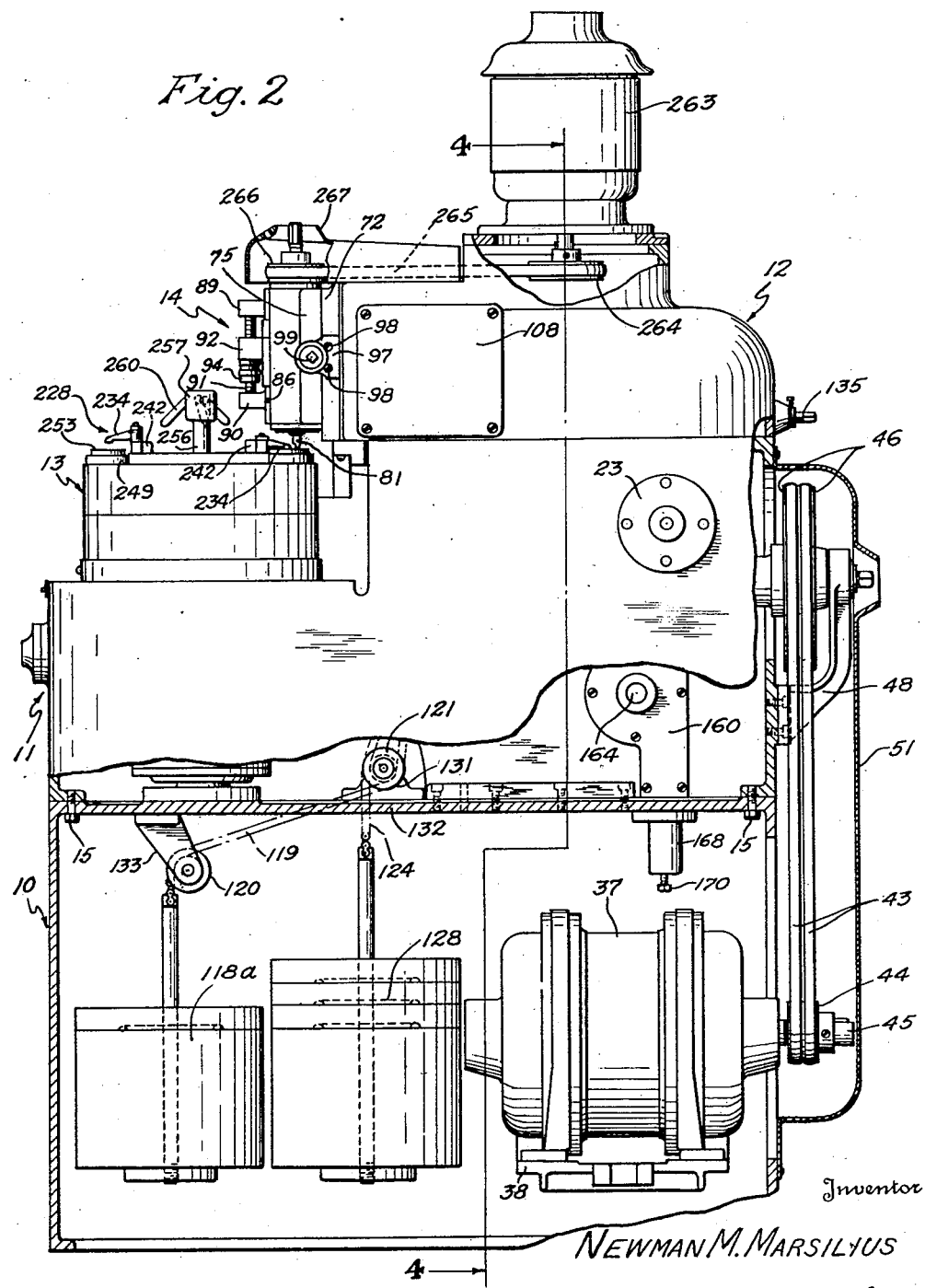

July 11, 1944.  N. M. MARSILIUS  2,353,480
MILLING MACHINE
Filed Aug. 28, 1941  19 Sheets-Sheet 3

Inventor
NEWMAN M. MARSILIUS
By John A. Hanrahan
Attorney

July 11, 1944.　　　N. M. MARSILIUS　　　2,353,480
MILLING MACHINE
Filed Aug. 28, 1941　　　19 Sheets-Sheet 5

Inventor
NEWMAN M. MARSILIUS
By John H. Hanrahan
Attorney

July 11, 1944.  N. M. MARSILIUS  2,353,480
MILLING MACHINE
Filed Aug. 28, 1941  19 Sheets-Sheet 8

Inventor
NEWMAN M. MARSILIUS
By John F. Hanrahan
Attorney

July 11, 1944.  N. M. MARSILIUS  2,353,480
MILLING MACHINE
Filed Aug. 28, 1941  19 Sheets-Sheet 10

Inventor
NEWMAN M. MARSILIUS
By John F. Hanrahan
Attorney

July 11, 1944.  N. M. MARSILIUS  2,353,480
MILLING MACHINE
Filed Aug. 28, 1941    19 Sheets-Sheet 11

Inventor
NEWMAN M. MARSILIUS
By John F. Hanrahan
Attorney

July 11, 1944. N. M. MARSILIUS 2,353,480

MILLING MACHINE

Filed Aug. 28, 1941 19 Sheets-Sheet 13

Inventor
NEWMAN M. MARSILIUS

By John J. Hanrahan
Attorney

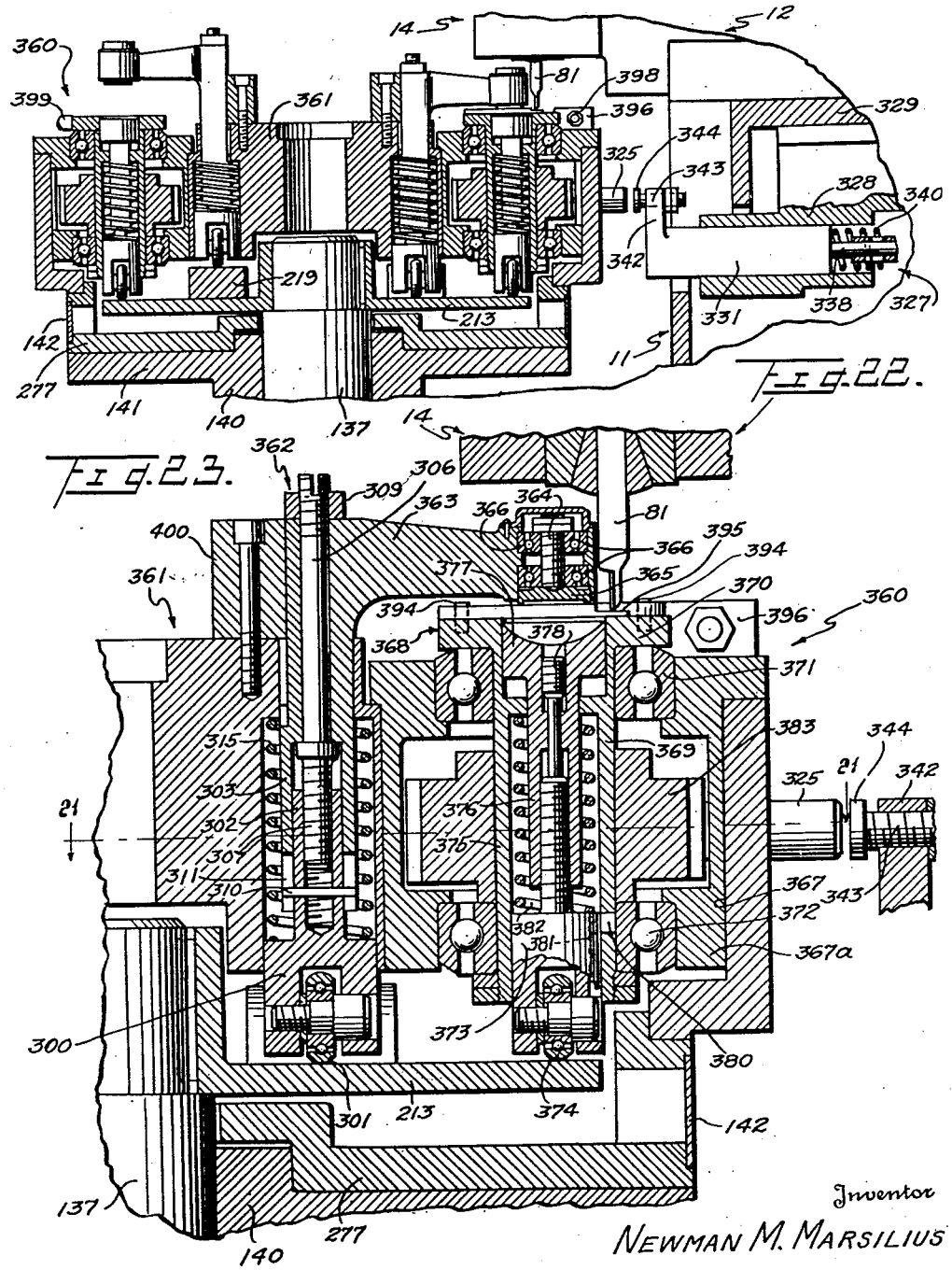

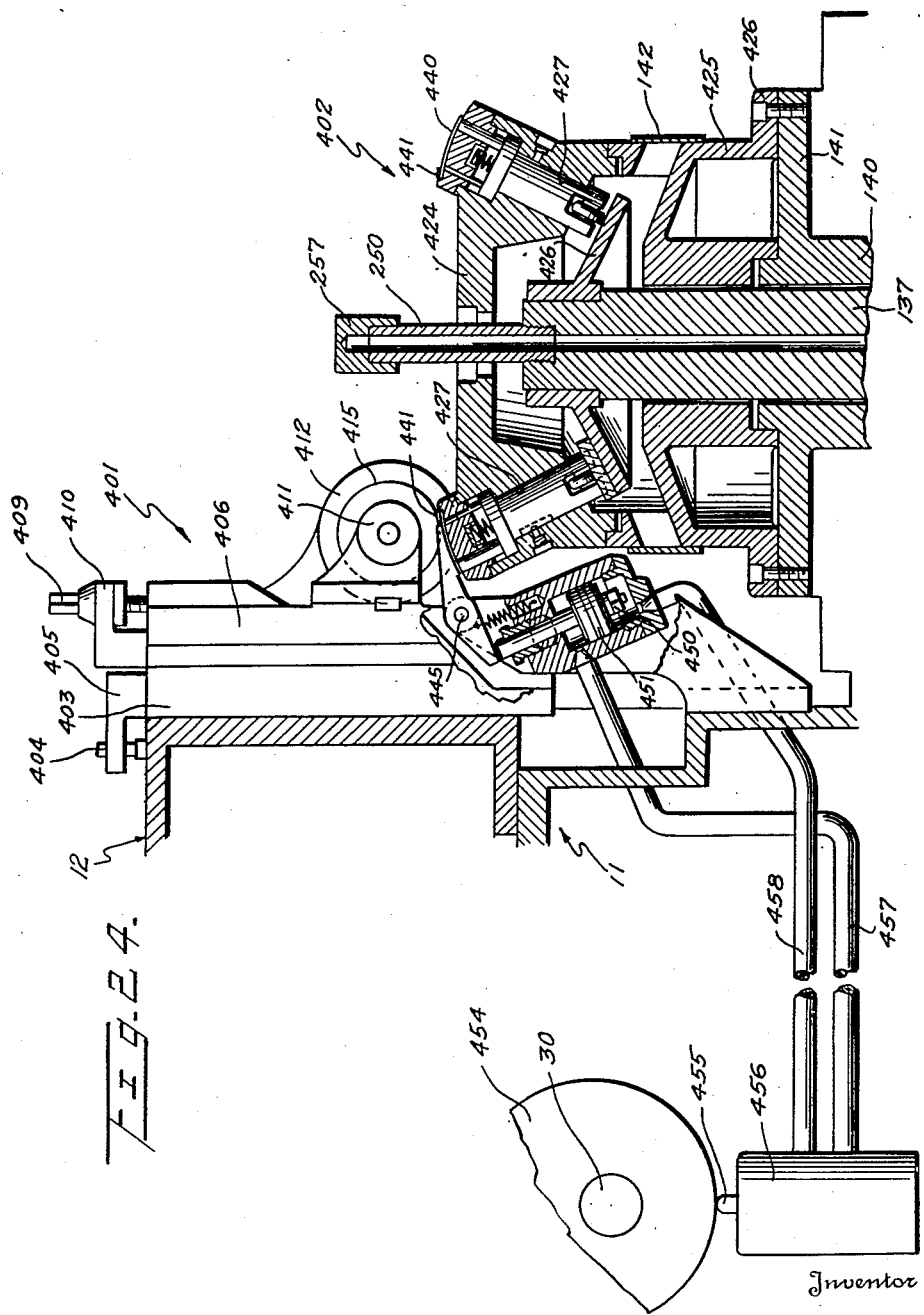

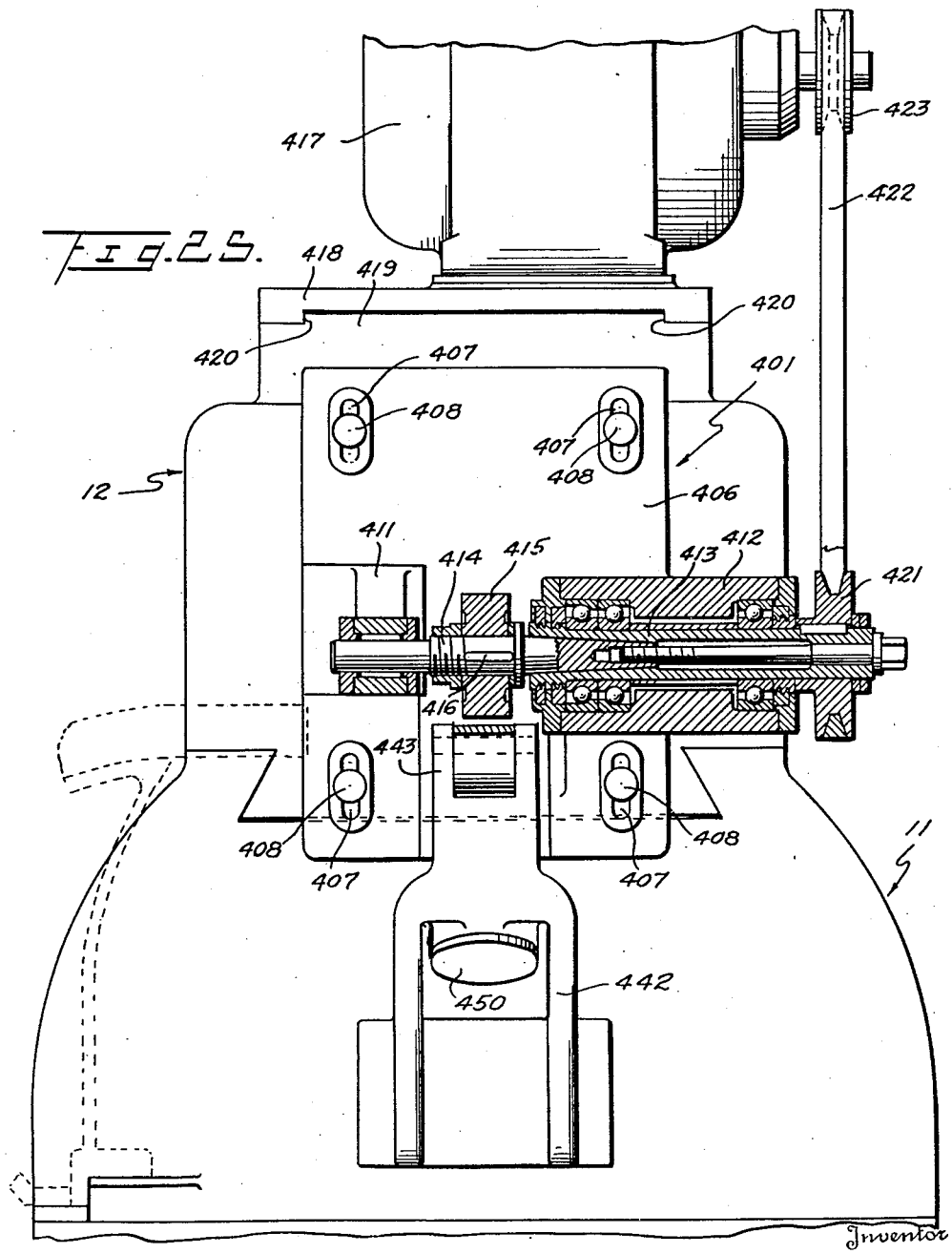

July 11, 1944.   N. M. MARSILIUS   2,353,480
MILLING MACHINE
Filed Aug. 28, 1941   19 Sheets-Sheet 17
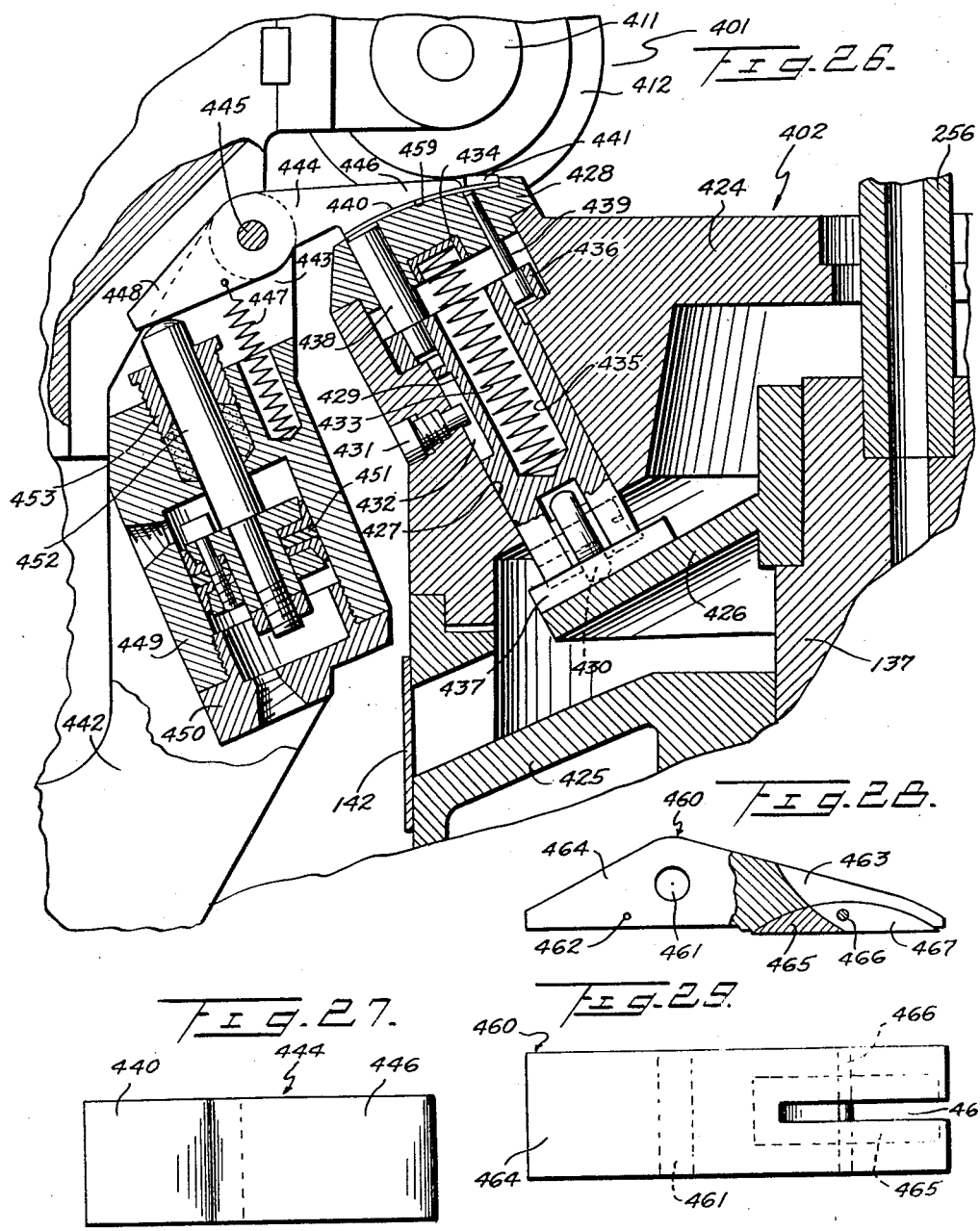
Inventor
NEWMAN M. MARSILIUS
By John J. Hanrahan
Attorney July 11, 1944. N. M. MARSILIUS 2,353,480
MILLING MACHINE
Filed Aug. 28, 1941 19 Sheets-Sheet 18

Inventor
NEWMAN M. MARSILIUS
By John S. Hanrahan
Attorney

Patented July 11, 1944

2,353,480

UNITED STATES PATENT OFFICE 2,353,480

MILLING MACHINE

Newman M. Marsilius, Bridgeport, Conn.

Application August 28, 1941, Serial No. 408,580

26 Claims. (Cl. 90—15.1)

This invention relates to new and useful improvements in machines and has particular although not necessarily exclusive relation to milling machines.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 2 is a side elevational view thereof on a somewhat larger scale and with parts broken away to show details;

Fig. 9 is a detail sectional view on a large scale, the view being taken as along the plane of the line 9—9 of Fig. 3 but with parts omitted;

Fig. 10 is a detail sectional view on an enlarged scale through the indexing plunger and adjacent yoke structure;

Fig. 12 is a top plan view of the ejector cam of the machine of the invention;

Fig. 13 is a side elevational view of such cam;

Fig. 20 is a view similar to Fig. 16 but showing a further slight modification;

Fig. 21 is a horizontal sectional view taken as along the plane of the line 21—21 of Fig. 23;

Fig. 22 is a vertical sectional view taken as along the plane of the line 22—22 of Fig. 20;

Fig. 23 is an enlarged vertical sectional view through one of the work holding means of the turret;

Fig. 24 is a longitudinal sectional view through the forward portion of a machine equipped with a further modification of turret and having a horizontal work spindle;

Fig. 25 is a view looking into the machine of Fig. 24 from the forward end thereof the turret being omitted and the tool spindle being shown in section;

Figure 26 is a sectional view on a larger scale, through the work clamp and a portion of the turret at the work cutting station of the machine;

Fig. 27 is a plan view of the clamping element or dog of Figs. 24 through 26;

Fig. 28 is a side elevational view of a modified form of work clamp or dog, a part being broken away to show inner construction;

Fig. 29 is a top plan view of the dog of Fig. 28;

Figure 1:
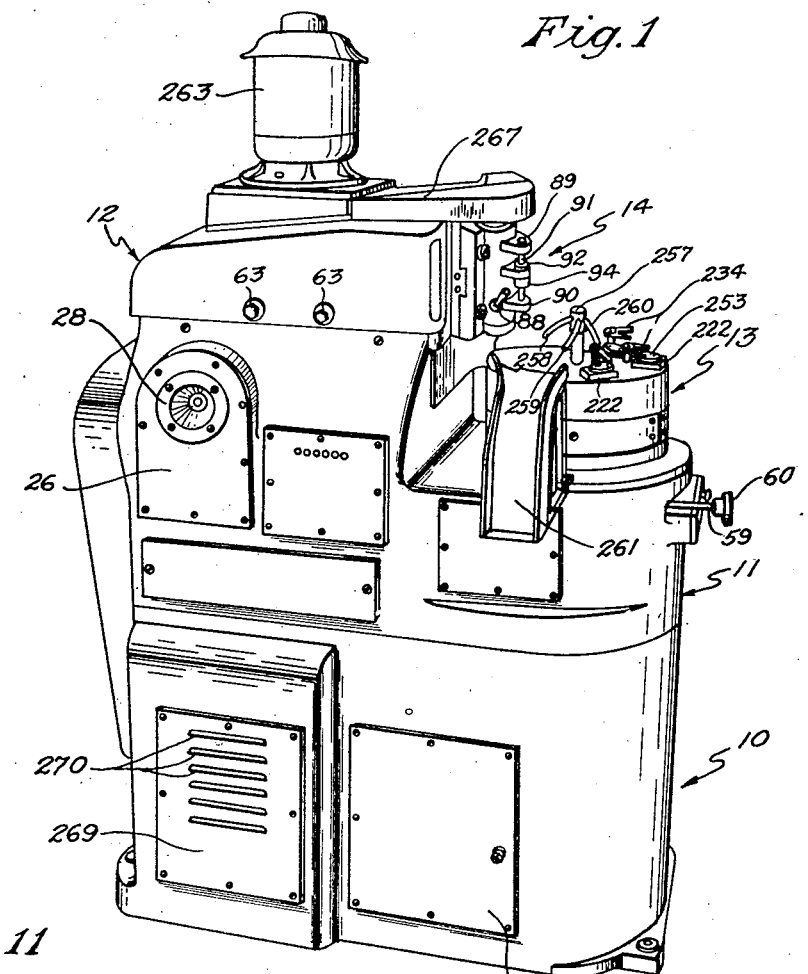
Fig. 1 is a perspective view of a milling machine constructed in accordance with the teaching of the invention.
Figure 11:
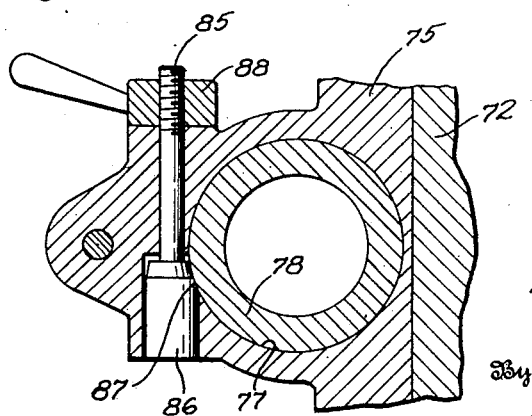
Fig. 11 is a detail sectional view on an enlarged scale showing the means for locking the tool spindle quill in adjusted position.
Figure 3:
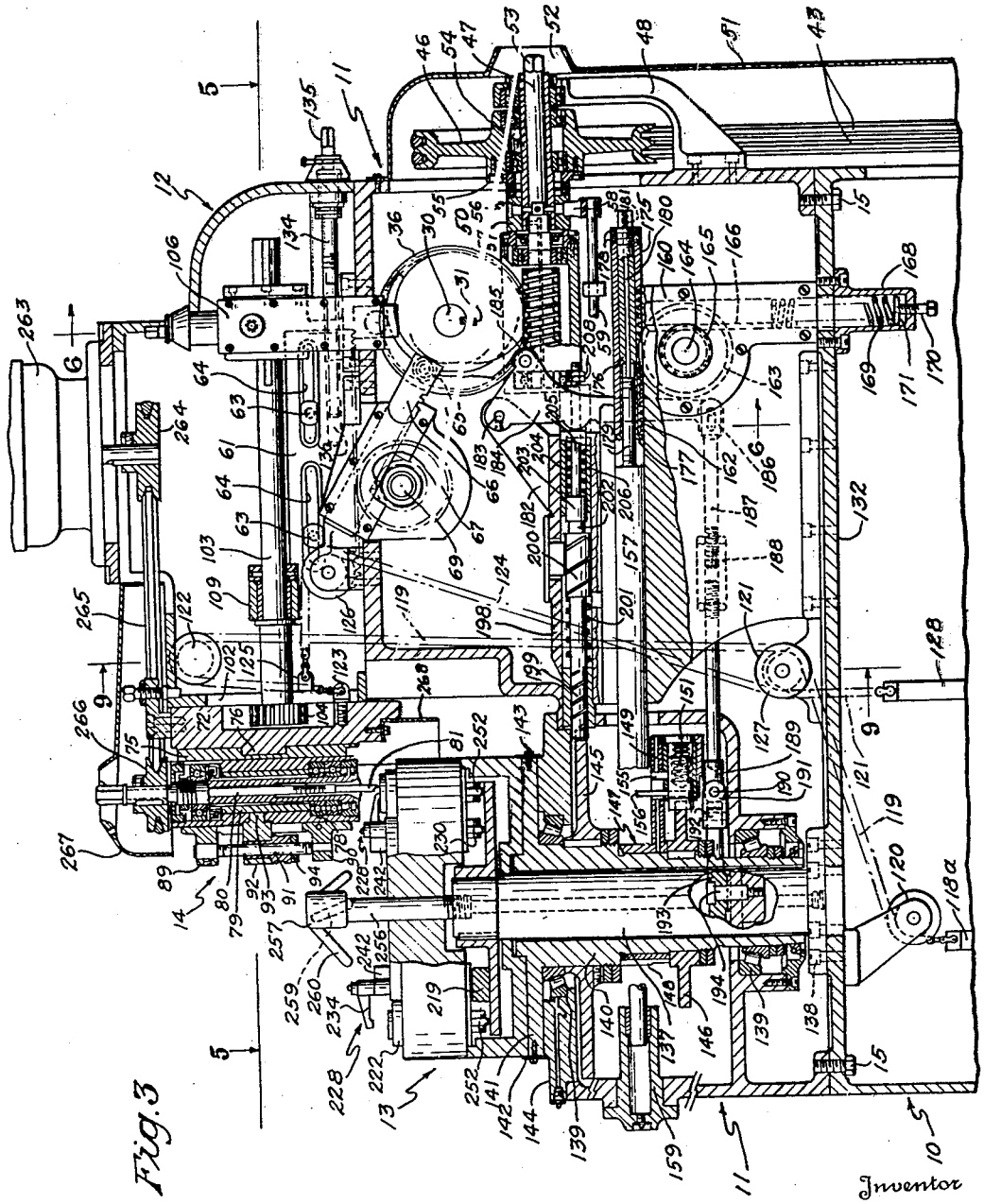
Fig. 3 is a longitudinal sectional view taken substantially along the plane of the line 3—3 of Fig. 5 but with the indexing yoke shown 120 degrees out of position.

Referring in detail to the drawings and at first more particularly to the form of the invention shown in Figs. 1 through 15, the machine of the invention is herein disclosed as a milling machine but includes features finding application in other types of automatic machines. Generally my machine comprises a base 10, a bed 11 on said base, a horizontal tool-head carrying slide 12 on said bed, and a work carrying turret 13 mounted on the bed at the forward end of the slide 12. Carried by the forward end of the slide 12 is a tool-head generally designated 14. This head may be adjusted both vertically and horizontally on the slide. Means, as will hereinafter appear, are provided for imparting vertical movement to the tool-head, horizontal movement to the slide, and a rotary type usually an indexing movement, to the turret.

Base 10, bed 11 and slide 12 are all hollow, preferably castings, and while the slide is movable longitudinally on the bed the latter is secured to the base as by the bolts 15. At its upper side the bed 11 (see Figs. 4, 6 and 9) is provided with undercut ways 16 and 17 in opposing relation and the lower end of the slide 12 is provided with rails 18 and 19 operating on said ways. Preferably a gib 20 is employed between rail 19 and way 17 for adjustment to take up for wear. It will be clear from the mentioned figures that the rails or extensions 18 and 19 prevent any vertical movement of the slide on the bed but that the slide is movable longitudinally of the ways and is supported on their upper surfaces.

Figure 4:
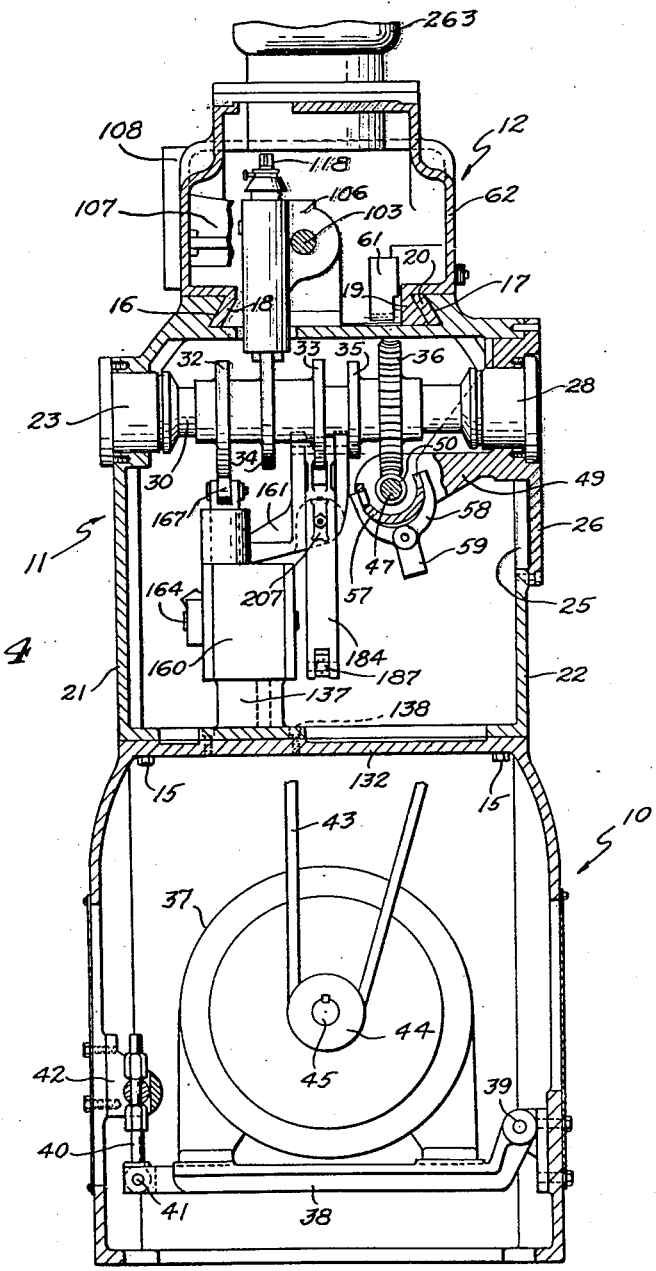
Fig. 4 is a vertical transverse sectional view taken substantially along the plane of the line 4—4 of Fig. 2.
Figure 6:
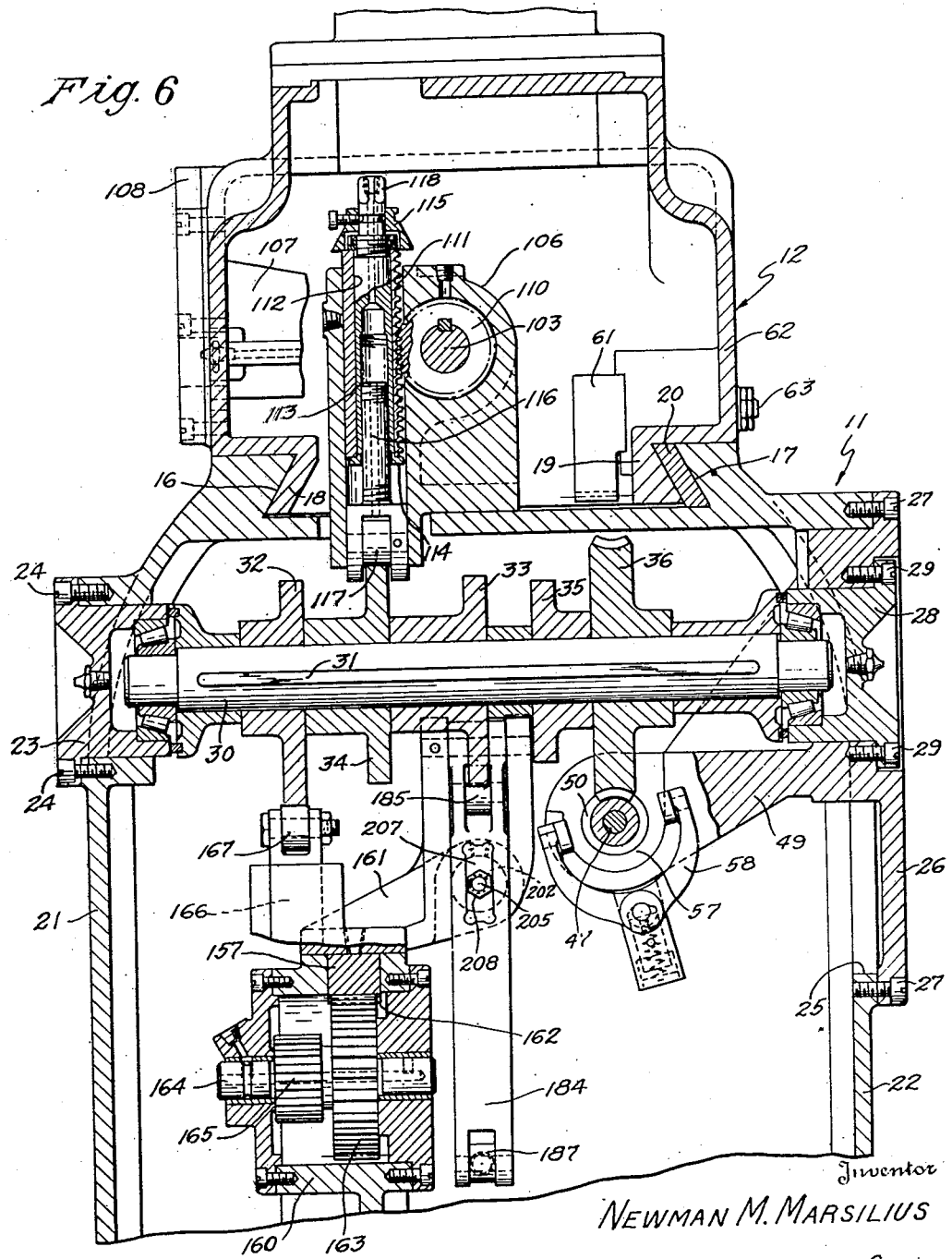
Fig. 6 is a vertical sectional view on an enlarged scale taken substantially along the plane of the line 6—6 of Fig. 3.

Bed 11 comprises side walls 21 and 22 of which the former removably supports a bearing 23 secured as by bolts 24 while the latter has an opening 25 over which is bolted a combined plate and a bearing bracket 26, secured in place as by the bolts 27 (see Figs. 4 and 6). Mounted in the bracket 26 and secured by bolts 29 is a bearing 28 in alignment with the bearing 23. A main cam shaft 30 is rotatably mounted by bearing 23 and 28. Bracket 26 may be removed along with bearing 28 for replacement of any part (hereinafter to be referred to) mounted on the shaft 30 or in fact for replacement of the shaft should that be desirable or necessary.

A key 31 secures to the shaft 30, for turning movement therewith, an indexing cam 32, a turret locking cam 33, a cam 34 for imparting vertical movement to the tool-head 14, a cam 35 for imparting horizontal movement to slide 12 and a worm wheel 36 through which the shaft is driven. In the machine base 10 (see Figs. 2 and 4) is an electric motor 37 mounted on a platform 38 pivoted at 39 and adjustable through a bolt 40 pivoted to the platform at 41 and anchored at its upper end to a bracket 42.

Belts 43 trained over pulleys 44 on the shaft 45 of motor 37 are also trained over pulley 46 turnable about a shaft 47 extending horizontally into the bed 11 of the machine from the rear end thereof (see Figs. 2, 3, 4, 5 and 6). Shaft 47 is mounted in outside bracket 48 and inside brackets 49 and within the bed 11 serves, as will appear, to drive a worm gear 50 meshing with the worm wheel 36 above mentioned. A sheet metal or other guard or casing 51 encloses the above mentioned pulleys and belts and has an opening 52 giving access to the faced end portion 53 of the shaft 47 whereby the latter may be engaged by a wrench or other tool for turning while adjusting and tooling the machine for any particular job.

Actually pulley 46 is turnable on a sleeve 54 about the shaft 47 and one element 55 of a clutch 56 is secured to the pulley. The other or movable element 57 of the clutch is keyed to the sleeve 54 and the latter is fast to the shaft 47. A yoke 58 is connected to the clutch element 57 in the usual manner and is operable by a rod 59 for shifting the element 57 into and out of clutching engagement with element 55. The rod 59 extends to the forward end of the machine in convenient reach of an operator, as will appear, and at the forward end of the machine is equipped with an operating knob 60. It will now be clear that by manipulation of rod 59 motor 37 may be placed in driving relation to the cam shaft 30 and may be disconnected therefrom.

A rack 61 (see Figs. 3, 4, 6 and 9) having its teeth disposed downwardly is secured to the wall 62 of the slide 12 as by bolts 63. Preferably these bolts pass through horizontal slots 64 in the body of the rack whereby on loosening of the bolts the rack may be adjusted forwardly and rearwardly on the slide to vary the stroke of the latter as will be made clear. Riding against the cam 35 above mentioned is a roller 65 on the rear or inner end of a bar 66 having rack teeth 67 meshing with a relatively small diameter gear 68 fixed to a short shaft 69 mounted by a bracket 70. Also fixed to shaft 69 is a gear 71 of larger diameter, as of twice the diameter of gear 68, meshing with the teeth of the rack 61 fixed to the slide 12.

From the above it will be seen that as the high part of cam 35 rides under the roller 65 the rack 66 will be advanced and meshing with gear 68 will impart a rotary movement to the latter and to the larger gear 71. As the latter gear is in mesh with the teeth of the rack bar 61 secured to the slide 12 it will be clear that the slide and the tool-head 14 carried thereby will be advanced. The intervening rack 66 and the gears 68 and 71 are employed in order that a slight rise in the cam 35 may be used to give a rather long stroke to the slide 12. For example, if the ratio in the gears 71 and 68 is two to one a one inch rise on the cam will mean a two inch stroke of the slide 12. Thus without using a large cumbersome cam a substantial movement may be imparted to the slide. By adjusting the position of the rack 61 on the slide (as will be described) the effective movement of the slide by the cam 35 may be adjusted.

The tool-head 14 (see Figs. 2, 3, 5 and 7) comprises a vertical slide 72 having a dove-tailed portion 73 fitted in the vertical ways 74 in the forward end of the slide 12. Horizontally adjustable across the forward face of the vertical slide 72 is a slide 75 fitted on a rail 76 on the front face of slide 72. The manner is which vertical movement is imparted to the slide 72 and thus to the whole tool-head 14 will later be described in detail. In slide 75 is a vertically extending cylindrical opening 77 having located therein a quill 78 receiving a sleeve 79 (see particularly Fig. 3) rotatably mounting a tool carrying spindle 80 to the lower end of which any suitable tool 81 may be mounted. Any suitable bearing means, such as shown, may be used for the mounting of the parts.

Figure 7:
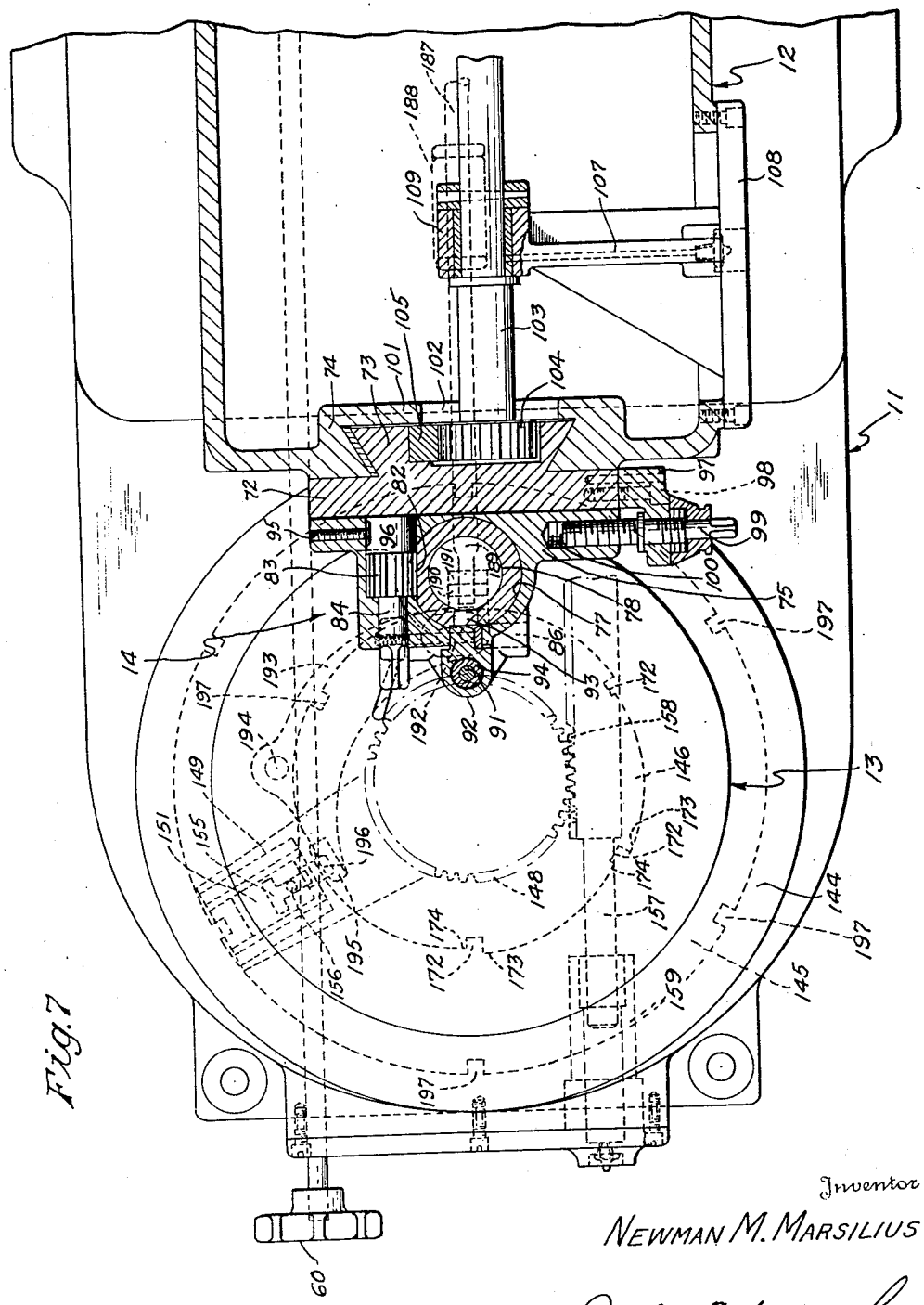
Fig. 7 is a view partly in plan and partly in section on a larger scale, of the forward portion of Fig. 5 but with certain turret carried parts omitted.

Along one side the quill 78 is provided with rack teeth 82 with which mesh the teeth of a gear 83 the shaft 84 of which is extended and exposed as shown best in Fig. 7 to be engaged by a wrench or other tool for turning whereby to raise and lower the quill and thus the tool spindle 80. Toward the lower end of slide 75 a bolt 85 (see particularly Fig. 11) is passed through the same and has a head 86 provided with a contour portion 87 adapted to be drawn against the quill 78 to lock it in postion on tightening of the bolt head thereagainst on manipulation of a nut 88 threaded to the bolt.

Projecting forwardly on the slide 75 are a pair of vertically spaced lugs 89 and 90 turnably mounting a micrometer screw 91 on which is disposed a block 92 having a lug or tongue portion 93 (see particularly Figs. 5 and 7) having a force fit in the quill through a vertical slot in the forward portion of the slide 75. On the screw 91 below the block 92 is a micrometer adjusting nut 94 against which the block normally engages. A binding screw 95 is tightened against an extension 96 on the gear 83 to bind the latter against any casual turning movement.

With the described construction the tool spindle may be vertically adjusted. To make an adjustment screw 95 is loosened as is the nut 88. If the tool spindle is to be adjusted downwardly micrometer nut 94 is run downwardly on screw 91 the proper distance and gear 83 is then turned to lower the quill 78 and parts therein lowering also the block 92 until it is brought into engagement with the nut 94. Then screw 95 and nut 88 are tightened to secure the parts in adjusted positions. When the spindle is to be adjusted upwardly gear 83 is operated to raise the quill and parts therein and thereafter micrometer screw 94 is adjusted upwardly to the proper position. Thereafter gear 83 is operated to lower all parts including block 92 until the latter engages the micrometer nut after which screw 95 and nut 88 are tightened.

To provide for horizontal adjustments of the slide 75 on the slide 72 a bracket 97 is secured to the slide 72 as by bolts 98 and extending forwardly at one edge of the slide 75 carries a micrometer adjusting screw 99 threaded into an opening 100 in the edge of slide 75. It will be clear that on turning of the screw 99 the slide 75 will be adjusted transversely of the machine along the rail 76 (see particularly Fig. 3) on the forward face of slide 72.

Slide 12 in its forward wall 101 (Figs. 3, 5 and 7) has a vertical slot 102 through which extends a shaft 103 carrying a gear 104 the teeth of which mesh with the teeth of a rack bar 105 secured against one vertical edge of a recess formed in the dove-tailed extension 73 of slide 72. With this construction it will be clear that as a turning movement is imparted to the shaft 103 the slide 72 and the whole tool-head 14 of which such slide forms a part, will have vertical movement imparted thereto. It will be understood that the shaft 103 is turned first in one direction and then in the other whereby the tool-head 14 is given movements in timed relation with other movements of the machine all as will appear. For the most part shaft 103 is located within the slide 12 and is supported adjacent its rear end by a combined bracket and housing 106 and toward its forward end by a bracket 107 mounted on a removable plate 108 and carrying a bearing 109 in which the shaft is supported.

Shaft 103 is turned in opposite directions by different means. Thus on the rear portion of said shaft within the bracket and bearing means 106 is a gear 110 meshing with the teeth of a vertically disposed rack 111 also located within said housing 106. Rack 111 (see Fig. 6) has a tubular opening 112 therethrough and in which is located a sleeve 113 turnable in the rack but held against longitudinal movement relative thereto by a bottom flange 114 at the lower end of the rack and a cap 115 at the upper end of the rack. Threaded into the sleeve 113 is a stem 116 carrying a roller 117 riding against the cam 34 above mentioned. The upper end 118 of the sleeve 113 is faced to be engaged by a wrench or other tool for turning of the sleeve whereby its threaded engagement with the stem 116 will result in longitudinal adjustment of such stem relative to the rack 111 whereby to change the effective relation of the latter to the cam 34 and the gear 110.

It will be understood that as the high part of cam 34 rides under roller 117 the rack 111 will be raised and meshing with the teeth of gear 110 the shaft 103 will be turned in a direction to operate through gear 104 and rack 105 and lower the tool-head 14 to bring tool 81 into engagement with work on the turret 13. As the high part of the cam 34 recedes the tool-head 14 is raised to carry the tool away from the work and as this movement takes place the teeth of rack 105 rotate gear 104 in the opposite direction and thus shaft 103 is rotated in a direction to cause gear 110 to feed rack 111 downwardly maintaining the roller 117 on the cam 34. The mentioned upward movement is imparted to the tool-head 14 by a weight 118a from which a chain 119 (Fig. 3) is carried over sprockets 120, 121 and 122 and then downwardly and attached to the vertical slide part 72 of the tool-head as at 123.

By a means similar to that just described the return horizontal movement is imparted to the slide 12. Thus a chain 124 has one end attached at 125 to the forward wall 101 of the slide and such chain is carried downwardly over sprockets 126 and 127 and at its lower end attached to a weight 128. Fig. 9 illustrates how the sprocket 122 is mounted by a bracket 129 secured to the top wall of the slide 12, sprocket 126 is mounted by a bracket 130 on the top wall of the bed 11, sprockets 121 and 127 are mounted by a bracket 131 on the top wall 132 of the base 10 and sprocket 120 is mounted by a bracket 133 suspended from base top wall 132.

From the above taken with the drawings it will be understood that as the rack 61 is advanced and carries the slide 12 with it the weight 128 is raised and that as the high part of cam 35 passes from under the roller 65 the weight serves to draw the parts in a return movement maintaining the roller on the cam. In connection with the adjustment of the rack 61 it is noted that when the bolts 63 have been loosened, and this may be accomplished from the exterior of the machine as the heads of such bolts are exposed as shown in Fig. 1, the slide is adjusted from the exterior of the machine by turning the adjusting screw 134 the faced end 135 of which is exposed at the rear of the machine (see Fig. 3) and the inner end of which is threaded into a socket 136 in the rack.

The turret 13 ((see Figs. 3 and 8) is mounted for turning movement about the upper end of a stationary post 137 projecting upwardly through the forward portion of the bed 11 and mounted and secured on the top wall 132 of the base 10 as by means of the bolts 138. Disposed about the post 137 for turning movement relative thereto and having suitable bearings 139 is a sleeve 140. Adjacent its upper end sleeve 140 has integral therewith a disc-like member 141 carrying a dust guard 142 in the form of a sheet metal ring fastened to the disc-like part as by screws 143. Keyed or otherwise fastened to the sleeve 140 below a wall portion 144 of the bed 11 (see Figs. 3 and 7) is a turret locking wheel 145 and also secured to the sleeve and located below wheel 145 is a turret indexing wheel 146.

Between such wheels and turntable about the sleeve 140 is a member 147 comprising a gear or gear segment 148 and an indexing yoke 149. The position of rest of this member 147 and yoke 149 is properly shown in Fig. 7 while in Fig. 3 the yoke is shown 120 degrees out of place. Supported by the yoke 149 at its under side is a cylinder 150 slidably mounting a pawl or plunger 151 normally urged to a projecting position (see Figs. 3 and 10) by a coil spring 152 bearing also against a plug 153 in the rear end of the cylinder.

In the yoke and in a wall of the cylinder 150 are aligned T-shaped slots having stem portions 154 and lateral portions 155. Secured in the indexing plunger 151 and projecting through such slots is a pin 156. This pin serves to maintain the plunger in proper alignment when the pin is in the stem portions 154 of the slots. When the turret is not to be indexed the pin 156 is grasped and drawn back in the slots and moved into a lateral slot portion whereby the plunger 151 will be held in a retracted position against the urging of coil spring 152.

A horizontal bar 157 (Figs. 3 and 7) carries rack teeth 158 meshing with the teeth 148 and this bar at its forward end is slidably supported in a member 159 and at its rearward end in a housing 160. Housing 160 is supported in any suitable manner as by a bracket 161 (Figs. 4 and 6). Within housing 160 the bar 157 is provided with rack teeth 162 meshing with the teeth of a gear 163 on a shaft 164 with a smaller diameter gear 165. The relative diameters of the gears 163 and 165 may be as desired but as shown the gear 163 is twice the diameter of the gear 165 and the purpose of this arrangement is to increase the throw obtained with a given cam rise as will be set forth.

A vertically disposed rack 166 carries at its upper end a roller 167 engaging the indexing cam 32 hereinbefore mentioned. Rack 166 passes into the housing 160 and has its teeth meshing with those of the small diameter gear 165. Clearly as the high point of cam 32 rides against the roller 167 the rack 166 will be forced downwardly and will cause rotary movement of the gear 165, and gear 163 and the movement of the latter will result in a horizontal forward movement of the bar 157. The lower end portion of rack 166 enters a depending extension 168 of the housing 160 and therein engages a coil spring 169 which may be adjustably compressed by the tightening of a screw 170 accessible from the exterior of the housing but within the latter carrying a disc 171 on which the lower end of the spring 169 engages. It will be understood that as the rack 166 is forced downwardly the spring 169 will be compressed and that when the high point of indexing cam 32 recedes the compressed spring will return the rack 166 maintaining the roller 167 in contact with the cam 32.

As herein disclosed the turret is provided with six stations although it will be understood that the number may be varied. Indexing wheel 146 is provided with a number of notches 172 corresponding with the number of stations on the turret. Index wheel 146 is moved counter-clockwise. It is relieved a slight amount at the trailing side of each notch 172 whereby the leading edge 173 of each notch projects radially beyond the trailing edge 174 thereof for a purpose to be described. The indexing of the turret takes place through movement of the sleeve 140 and its disc 141 by which the turret is carried.

Thus in predetermined timed relation as the index cam 32 forces the rack 166 downwardly the small diameter gear 165 is turned and through shaft 164 turns large diameter gear 163 meshing with the teeth 162 of bar 157 whereby the latter is moved rearwardly. Teeth 158 on the forward portion of the bar meshing with the teeth 148 of member 147 impart rotary movement to such member about the sleeve 140. However, member 147 includes the indexing yoke 149 carrying the indexing plunger 151 and as the latter is, when in a position of rest, engaged in one of the notches 172, the index wheel is turned in a counter-clockwise direction an amount depending on the arc through which the member 147 is moved by the rearward movement of bar 157. Since the indexing wheel is keyed to the sleeve 140 the latter is given an indexing movement with the wheel.

Means are provided for releasing plunger 151 from the engaged notch 172 of the index wheel at the end of each indexing movement and for simultaneously locking the sleeve and thus the turret against any casual movement. At the end of the indexing movement as the high point of the cam 32 recedes the spring 169 urges the rack bar 166 upwardly maintaining the roller 167 in engagement with cam 32 and causing reverse movement of the gears 165 and 163, the bar 157 and the indexing member 147 returning all these parts to their normal positions. During this return movement the front support 159 of the bar 157 acts as a dash pot whereby the described return movement is a smooth steady movement.

The rack teeth 162 are on a hollow bar like member 175 carried by a sleeve 176 and the member is held on the sleeve between a flange 177 at one end and nuts 178 at the other end. Sleeve 176 is threaded onto a reduced diameter rear end portion 179 of bar 157 for attaching the rack teeth carrying member 175 to said bar and for threading more or less onto the end 179 to adjust the effective relation of the rack to the gear 163 and thus to adjust the throw of bar 157 and the arc of the indexing movement imparted to wheel 146. A pin 180 through the sleeve 176 is held against the end of reduced portion 179 of bar 157 and is tightened by screw 181 to establish a lock and prevent casual turning of the sleeve 176 on portion 179. When any adjustment of the sleeve and thus of the rack teeth 162 is to be made the screw 181 is first backed off the pin 180.

Cam 33 above referred to as a locking cam serves to lock the sleeve 140, and thus the turret 13 in exact position at the end of each indexing movement and to maintain these parts in fixed positions until time for the next indexing movement. Simultaneously as said cam actuates means to effect said locking it actuates other means to retract the plunger 151 from a notch 172 of the wheel 146 whereby on the above described return movement of bar 157 the member 147 together with the indexing yoke 149 and parts carried thereby are returned to their normal positions. To the above ends a bracket 182 (Fig. 3) has pivoted thereto at 183 an arm 184 carrying a roller 185 riding against the cam 33. At its lower end by a pin and a slot connection 186 arm 184 is connected with the rear end of a bar or link 187 comprising a pair of parts adjustably connected by a turn buckle 188.

At its forward end bar 187 has secured thereto a link element 189 pivoted at 190 to an element 191 having a pin and slot connection 192 with an end of a dog 193 pivoted intermediate its ends at 194 and at its free end having an upstanding lug 195. In the normal position or the position of rest of dog 193 the lug 195 is immediately forwardly of the reduced tooth-like end portion 196 of the pawl 151 when the latter is at the end of an indexing stroke. The relation of the cams is such that at the end of an indexing stroke the yoke 149 is positioned as in Fig. 7 and then the cam 33 through link 187 causes rocking movement of the dog 193 about the pivot 194 in a direction to have lug 195 force the plunger 151 to a retracted position against the tendency of the spring 152. At this time as will later appear the sleeve 140 and the parts carried thereby are locked against turning movement.

Therefore with the plunger 151 retracted as return movement is imparted to bar 157 the member 147 and parts carried thereby including plunger 151 are returned to normal position. Lug 195 is of width greater than that of a notch 172 of the indexing wheel and consequently when it has forced the plunger to retracted position it prevents it from again immediately entering the same notch and on leaving the lug 195 the plunger rides against the edge of the wheel 146 until it comes to the next notch 172 into which it is snapped by the spring 152.

Locking wheel 145 has a series of notches 197 opening through its peripheral edge and the notches 197 corresponding in number and in relative spacing with the notches 172 in the indexing wheel 146. A casing 198 mounts a plunger means including a slidable bolt 199 adapted to be forced into one of the notches 197 simultaneous with the retraction of the plunger 151 from one of the notches 172. Bolt 199 includes an enlarged diameter portion 200 against which bears an end of a coil spring 201 and this spring normally serves to retain the bolt in a retracted position free of the wheel 145. Against a reduced diameter extension 202 of bolt 199 head 203 of a plunger 205 bears and a coil spring 204 surrounds the stem portion of said plunger. Plunger 205 and spring 204 are enclosed in a slidable casing 206 through which the arm 184 depends. The shank of plunger 205 passes through an opening 207 (Figs. 4 and 6) in arm 184 and beyond the casing 206 has a nut 208 threaded thereon.

Tightening of the nut 208 retracts plunger 205 increasing the compression of spring 204. As arm 184 passes through the rear of casing 206 when said arm is rocked about its pivot 183 by the cam 33 the casing is forced forwardly or in the direction of the front of the machine. At this particular time the machine has been indexed and one of the notches 197 of wheel 145 is in alignment with the forward end of bolt 199. Therefore since plunger head 203 is against the rear end of the bolt and is moved forwardly with casing 206 the bolt is projected against the action of spring 201 and enters a notch 197 locking the wheel 145 and sleeve 140 together with all parts carried thereby against any casual turning movement. To insure locking of the wheel 145 by bolt 199 the casing 206 is given an excessive forward movement.

When the bolt seats in the notch 197 the casing 206 continues its forward movement but such movement results only in the sliding of the casing and a further compression of the spring 204 since plunger 205 at this time is solid against bolt 199 and the latter has solidly seated in a notch 197. The cam 33 retains the locking parts in the above described position while the member 147 has its return movement and while a piece of work is being acted on by a tool. When the next indexing movement is to be made cam 33 recedes from roller 185 and the spring 201 returns bolt 199, plunger 205, cage 206, arm 184 and link 187 and its connected parts to their normal positions. As bolt 199 is withdrawn from a notch 197 movement is imparted to a bar 157 and an indexing stroke made at the end of which plunger 151 is withdrawn from a notch 172 of the indexing wheel and simultaneously the forward end of the bolt 199 is "socked" into the next notch 197 of the locking wheel 145.

Turret 13 (Figs. 3, 5 and 8) carries six work holders and locking wheel 145 and indexing wheel 146 have the same number of notches 197 and 172 respectively as there are work holders on the turret. The turret comprises a base portion 209 including a disc-like part 210 disposed on the disc or flange 141 of the sleeve 140 whereby the turret is turned with the sleeve. In addition to the part 210 the member or turret base 209 includes an upstanding circular wall 211 supporting a turret block 212.

Block 212 is in vertical spaced relation to the base part 210 and located in the space thus provided is a cam carrying plate 213 keyed or otherwise fixed as at 213a to the post 137 whereby to be held stationary therewith. Mounted on the upper side of plate 213 and secured thereto by screws 214 is an ejector cam (Figs. 5, 8, 12 and 13) 215 in the form of short section of an arc and having its elevating edge 216 in the form of a rather long taper and having its trailing edge 217 a somewhat more abrupt taper. Also on the upper side of the plate 213 and secured as by screws 218 is a cam 219 (Figs. 5, 8, 14 and 15). Cam 219 has a tapered approaching or elevating edge 220 and a tapered return edge 221 and this cam comprises approximately three-quarters of a circle as shown best in Fig. 14.

Figure 8:
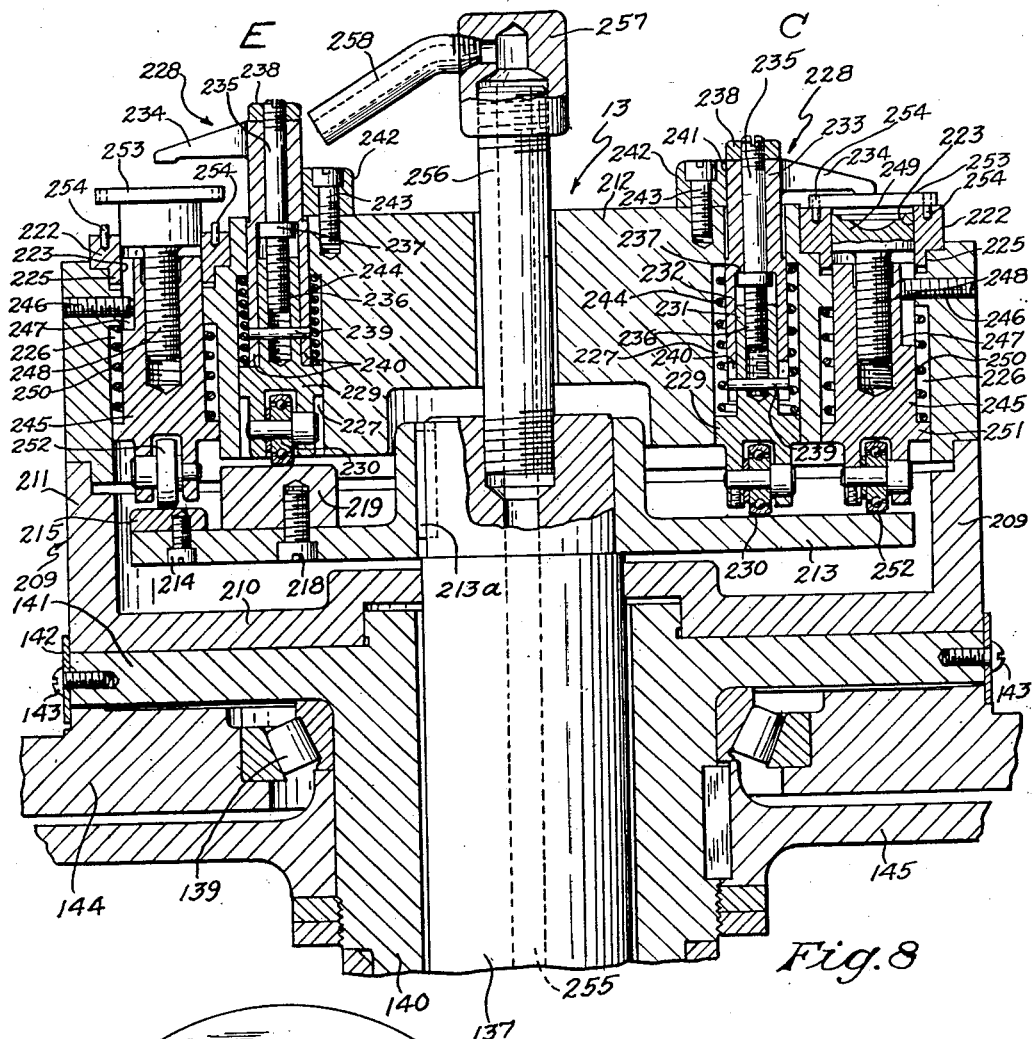
Fig. 8 is a sectional view on a larger scale through the work carrying turret of the machine.
Figures 14, 15:
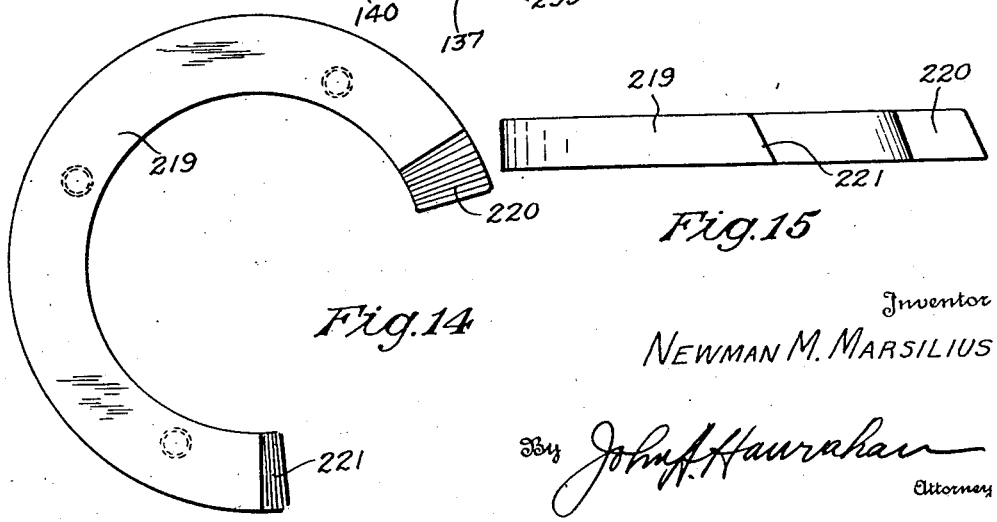
Fig. 14 is a top plan view of the clamping finger lifting cam of the machine.
Fig. 15 is a side elevational view of such cam.

The six work holders of the turret are each designated 222 and each comprises a block having an opening 223 therethrough (see Fig. 8). These work holding blocks are secured in place in any desired manner as by the screws 224 of Fig. 5 and by having reduced under portions 225 recessed somewhat into the turret block 212. Beneath each work holder 222 and in alignment with the opening 223 therethrough the turret block 212 has an opening 226. Also block 212 has openings 227 therethrough each of which is located slightly inwardly of and in radial alignment with one of the openings 226. Openings 226 each receive a normally retracted means to be actuated by the cam 215 for ejecting or raising the work off the holders 222 at a predetermined time and place while openings 227 receive a portion of a means for clamping the work onto the holders while a tool is operating on the work but adapted to be elevated to an inoperative position by the cam 219 at predetermined times.

Figure 5:
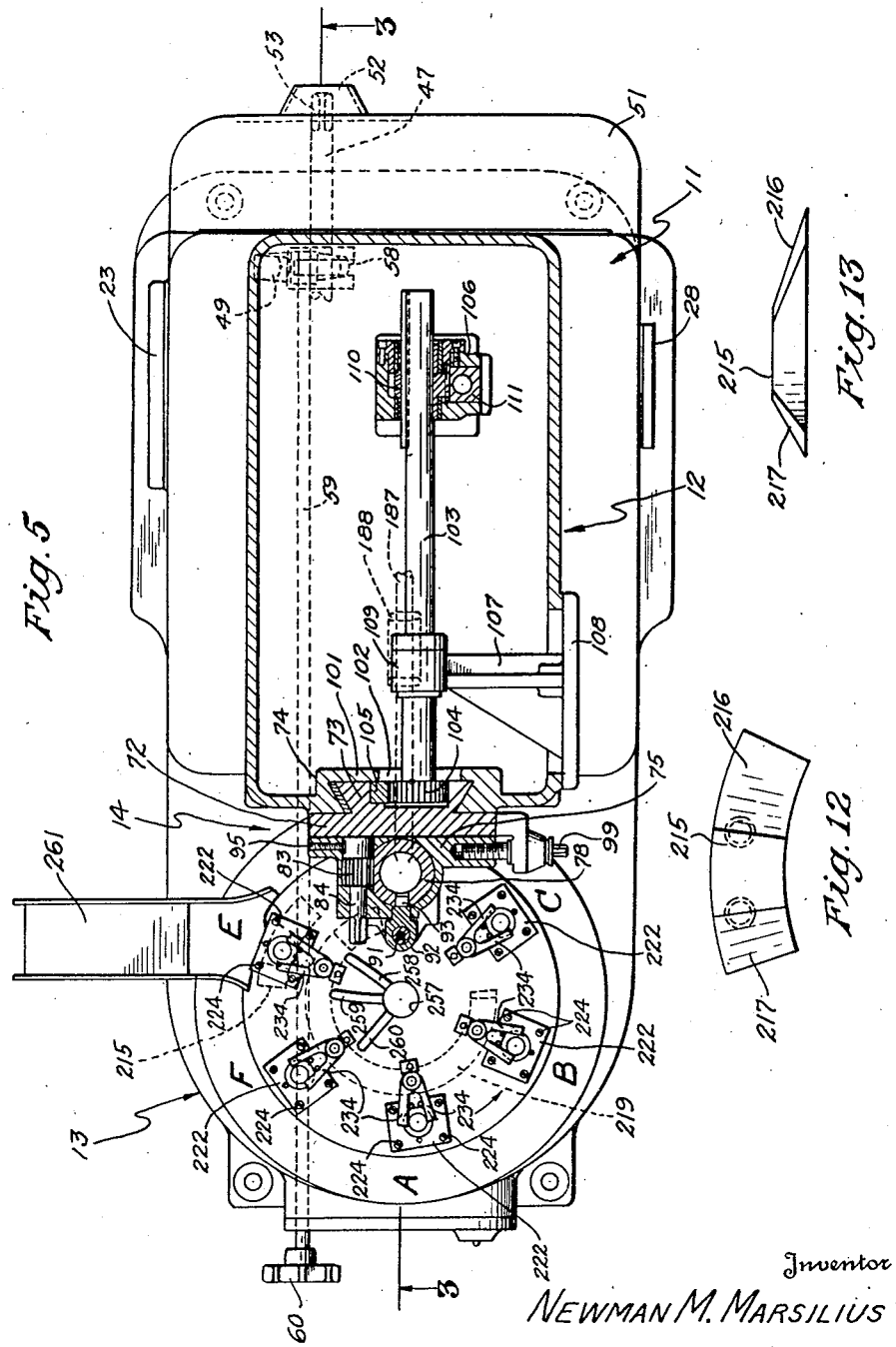
Fig. 5 is a horizontal sectional view taken substantially along the plane of the line 5—5 of Fig. 3.

Associated with each opening 227 is a work clamping means generally designated 228 and comprising an inner member 229 vertically movable in the opening and at its inner end carrying a roller 230 disposed over the upper side of the disc 213 or riding on the cam 219 depending on the location of the work clamp at any particular time. Member 229 includes a reduced diameter upwardly extending tubular portion 231 telescopingly received in the lower tubular portion 232 of the actual work clamping part 233 which at the upper side of the block 212 comprises a pair of diverging fingers 234 as best shown in Fig. 5. A rod 235 passes longitudinally through the member 233 and has its lower end 236 threaded into the part 231. Shoulder 237 on the rod 235 is clamped against the bottom wall of the part 233 on tightening of the nut 238 on the outer end of such rod. A pin 239 passes through the tubular part 231 and enters slots 240 in the tubular part 232 to prevent relative turning of these parts.

With the described construction it will be clear that on loosening of the nut 238 the rod or screw 235 may be turned to draw the parts 229 and 233 toward one another or to move such parts from one another whereby to increase or decrease the telescoping relation between portions 231 and 232 and thereby decrease or increase the effective length of the stem portion of the work clamp 228. The back edge 241 of the part 233 is flatted and a block 242 is secured by a screw or the like 243 in position to have said flat ride against the flat of the block in all positions of the part of 233 whereby turning of the latter about its own longitudinal axis is prevented. A coil spring 244 in the opening 227 bears at its lower end against the part 229 and at its upper end against a portion of the turret block. This spring is constantly urging the part 229 downwardly or inwardly of block 212 and is thus constantly tending to draw the clamping fingers 234 toward the workholders 22.

Within each opening 226 of block 212 is an ejector member or plunger 245 vertically movable but held against turning movement by a pin 246 carried by block 212 and entering a longitudinally extending groove 247 in the member. Threaded into the member 245 is a stem 248 provided with an ejector head 249 normally located in the opening 223 through the aligned work holder 222. A coil spring 250 in the opening 226 bears against the shoulder 251 of member 245 and resists movement of said member outwardly of the recess. At its inner end member 245 mounts a roller 252 and the spring 250 acts to keep this roller against the upper side of the disc 213 or of the cam 215 depending on the position of the particular ejector at any particular time.

Briefly the operation of the ejector and work clamp will be given with reference to Fig. 8. There position C shown in the right portion of the figure illustrates the manner in which the fingers 234 of the clamp 228 hold a piece of work 253 against a workholder 222. The ejector head 249 is below the work and the latter is on locating pins 254. Rollers 230 and 252 are both against the upper side of plate 213. Position E shown in the left hand portion of the figure illustrates the relationship of the parts while the work piece 253 is being removed from the machine. There the rollers 252 and 230 are on the cams 215 and 219 respectively with the result that the work clamping means 228 is elevated and its fingers 234 are spaced above the work 253 but the latter has also been elevated off the work holder 222 and is being supported by the ejector for removal from the machine in a manner to be described.

Connected to communicate with an opening 255 through the post 137 and extending upwardly through the block 212 is a pipe 256 carrying at its upper end a manifold 257 through which tubes 258, 259 and 260 communicate with pipe 256. Compressed air is fed the opening 255 and discharged through the tubes 258, 259 and 260 for a purpose to be described. Here, with particular reference to Fig. 5, it is noted that the various stations of the turret have been designated A, B, C, D (station D is below the tool holder in this figure), E and F and that a discharge chute 261 is associated with station E, that the two compressed air discharge tubes 258 and 259 are directed toward that station and that compressed air discharge tube 260 is directed toward station F.

Means independent of the drives for the other parts of the machine are provided for rotating the tool spindle and thus the tool. An independent electric motor 263 is mounted on the slide 12 for movement therewith and through a pulley 264 and a belt 265 drives a pulley 266 on the tool spindle. A suitable guard 267 may inclose these parts.

Assuming that the motors 37 and 263 are energized, to place the machine in operation it is but necessary to shift clutch element 57 into engagement with clutch element 55 and this is accomplished by manipulation of rod 59. At any point of its cycle of operation the machine may be stopped by disconnecting the clutch elements, i. e. by pushing knob 60 on rod 59. With the clutch coupled the operator may supply work to the holders 222 at any of the stations, F, A, and B since the clamping fingers 234 are maintained raised at all three of these stations the roller 230 then being on the cam 219. In addition at the mentioned stations (and also at stations C and D) the ejector head 249 is retracted the roller 252 being on the cam 215 only at station E.

At station F tube 260 delivers a blast of air onto the work holders to clear the same of chips or the like. As a particular work holder and its parts approach station C roller 230 rides down the incline 221 of cam 219, being forced by spring 244 and the clamping fingers 234 are brought into clamping engagement with the work by said spring. The next indexing movement of the turret carries the work thus clamped from station C to station D where the tool is brought into engagement with the work. It will be understood that the turret is held stationary between indexing movements.

As the tool 81 leaves the work the next indexing movement starts and the finished piece is carried from station D to station E. As station E is approached roller 230 rides up the approach 220 of cam 219 raising the clamping means off the work 253 and when such roller is actually on the cam the work clamp 228 is positioned as shown to the left in Fig. 8. Almost immediately roller 230 engages cam 219 the roller 252 of the associated ejector rides upon to the cam 215 raising the work 253 off the locating pins 254. The blasts of air directed toward station E through tubes 258 and 259 blows the completed piece of work off the ejector at station E and into the chute 261 from which the work may fall into a suitable tote-box or the like. The top of the chute is left open so that there will be no backing up of finished pieces onto the machine.

It is thought that the indexing operation should be briefly described. Cam 32 depresses rack bar 166 rotating gears 165 and 163 in a manner to shift the bar 157 rearwardly. This bar through its engagement with the teeth 148 of the element 147 imparts a turning movement to the latter and the yoke 149 with which pawl 151 is movable. The pawl being engaged with a notch 172 of the indexing wheel 146 the latter is turned and being fast to sleeve 140 turret 13 is indexed one station. At the end of the indexing movement lock bolt 199 is forced into a notch in the locking disc 145 and the dog 193 is operated through link 187 forcing pawl 151 out of the notch of the indexing wheel and permitting member 147 carrying the pawl to be moved back to normal position as the spring 169 moves the rack bar 166 upwardly as the high point of cam 32 recedes from the roller 167. The cams 32 and 33 have their profiles in such relation to one another that the turret is indexed and locked in its new position and then the indexing pawl is forced out of a notch 172 of the indexing wheel.

When a piece of work is brought to station D cam 34 raises rack bar having the teeth 111 and through gear 110 rotates the shaft 103 in a direction to have its gear 104 operate on the rack 105 of the vertical slide 73 in a manner to lower the same and in fact lower the whole tool head 14 to bring the tool 81 against the work. At this time cam 35 acting against the roller 65 advances the rack bar 66 to rotate gear 68 and thus gear 71 to have the latter acting through the rack bar 61 move the slide 12 forwardly carrying tool 81 across the work. When the cut has been made the high part of cam 34 recedes from under roller 117 and the weight 118a acting through chain 119 raises the tool head 14 lifting the tool out of the work and the high point of cam 35 receding from roller 65 the weight 128 acting through chain 124 retracts slide 12 and the tool head 14 carried thereby to their normal positions.

In the rear of the turret is a guard plate 268 and on the base of the machine is a plate 269 having ventilating slits 270. Plate 269 may be removed to give access to the rear portion of the interior of the base 10 and a plate 271 may be removed to give access to the forward portion of the interior of the base.

Referring now to the modification shown in Figs. 16 through 19, it will be seen that essentially, the modification relates to certain changes in the turret structure. Therefore the parts of the machine which remain the same in the modification as in the figures first described, have only been suggested in Figs. 16 through 19 to avoid unnecessary repetition in the drawings. Thus in the modification bed 11 is suggested as are the stationary post 137 supporting the turret, the sleeve 140 for indexing the turret and the tool-head 14 and these parts are the same or substantially the same as in Figs. 1 through 15. An extra cam 275 has been added on the main cam shaft 30 but otherwise the changes of the modification relate nearly exclusively to the turret.

In the modification the turret generally designated 276 includes a base 277 supported on the disc 141 of sleeve 140 and it will be understood that the latter is continuously rotated or indexed as may be required. In the present instance the turret carries six work holding blocks 278 corresponding with the blocks 222 of the figures first described and mounted as will be set forth in detail. By the indexing means previously described the turret 276 is advanced through the six stations A, B, C, D, E and F which correspond to the similarly identified stations of Figs. 1 through 15.

Main turret block 279 is supported on the base or base plate 277 being mounted on the edge portions thereof whereby to provide clearance for the cam plate 213 stationary with the post 137 and supporting the ejector cam 215 and the locking or clamping finger release cam 219 as and for the purpose previously described. In turret block 279 are six equally spaced rather large diameter openings 280 each receiving a ring or cylinder 281 fixed with respect to the block and turnably mounted in each cylinder 281 is a plug or member 282 to be described.

Cylinders 281 each comprise a radial flange-like part 283 disposed on the upperside of the main block 279 and on their inner sides approximately mid-way their end the cylinders are provided with annular thickened portions 284 above and below which are bearings 285 and 286 respectively. Plug 282 in addition to a body 287 includes an upper radial flange 288 extending over the upper bearing means 285 and carrying a seal or dust excluding ring 289. It will be understood that the plugs 282 are turnable about their longitudinal axis in the cylinders 281 on the bearings 285 and 286.

Each plug 282 has a pair of openings 290 and 291 therethrough from top to bottom. In the opening 290 is a plunger 292 normally urged downwardly of said opening by a coil spring 293. At its lower end plunger 292 mounts a roller 294 for riding up onto the ejector cam 215. At its upper end the plunger 292 has a reduced diameter portion 295 entering an opening 296 through the work holder 278 and therein mounting an ejector head 297 secured to the plunger as by a binding screw 298.

The ejector head 297 engaging the upper side of the plug 282 limits movement of the ejector by the coil spring 293 and as will later more particularly appear the roller 294 rides onto the ejector cam 215 at the proper time to eject a finished piece of work from the holder 278. The ejector is elevated or raised by the cam 215 against the opposition of the coil spring 293 and therefore the ejector is raised only a distance equal to the amount of raise given the roller 294 due to the thickness of the cam.

Figure 16:
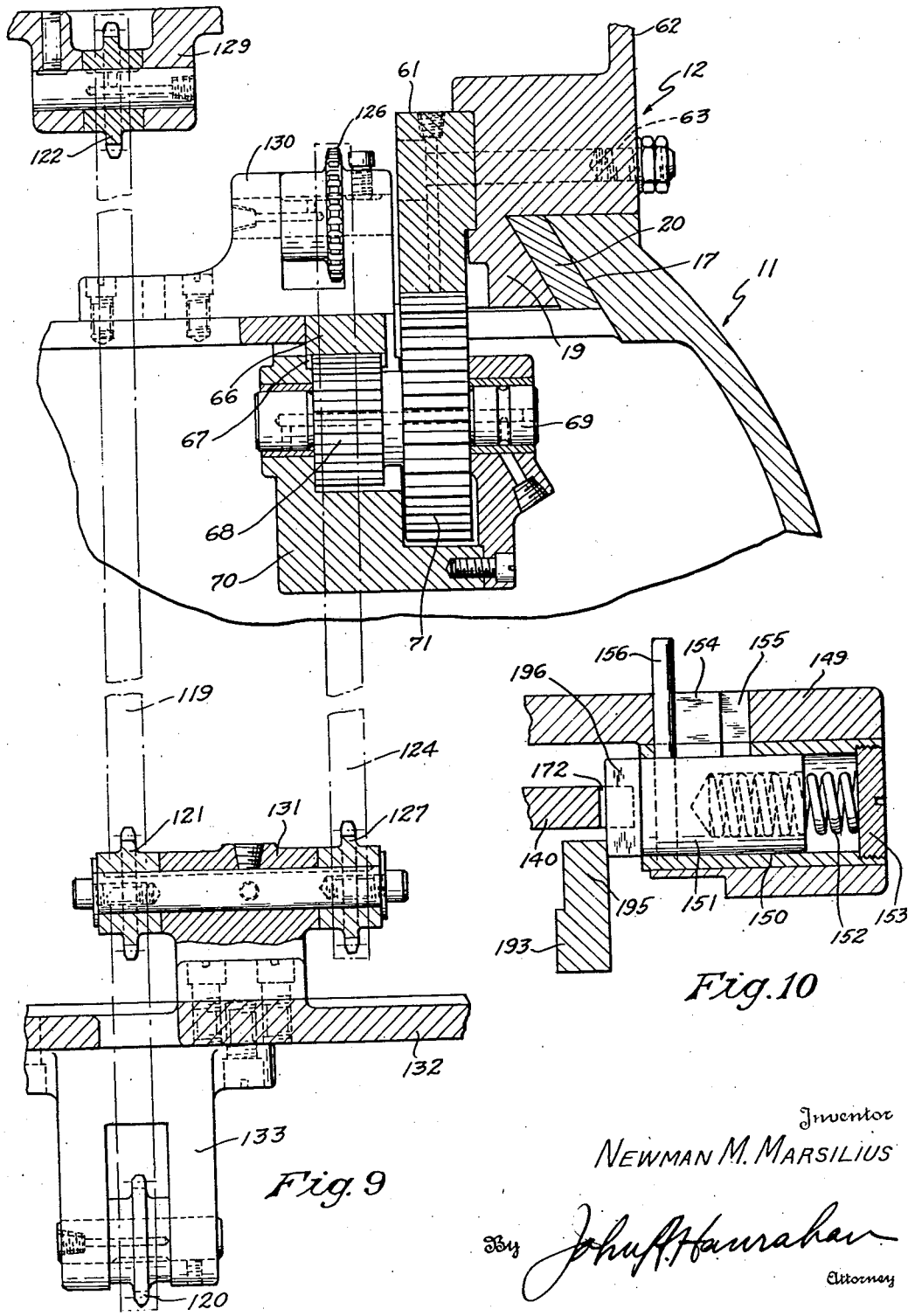
Fig. 16 is a plan view illustrating a modification of the turret structure.
Figure 17:
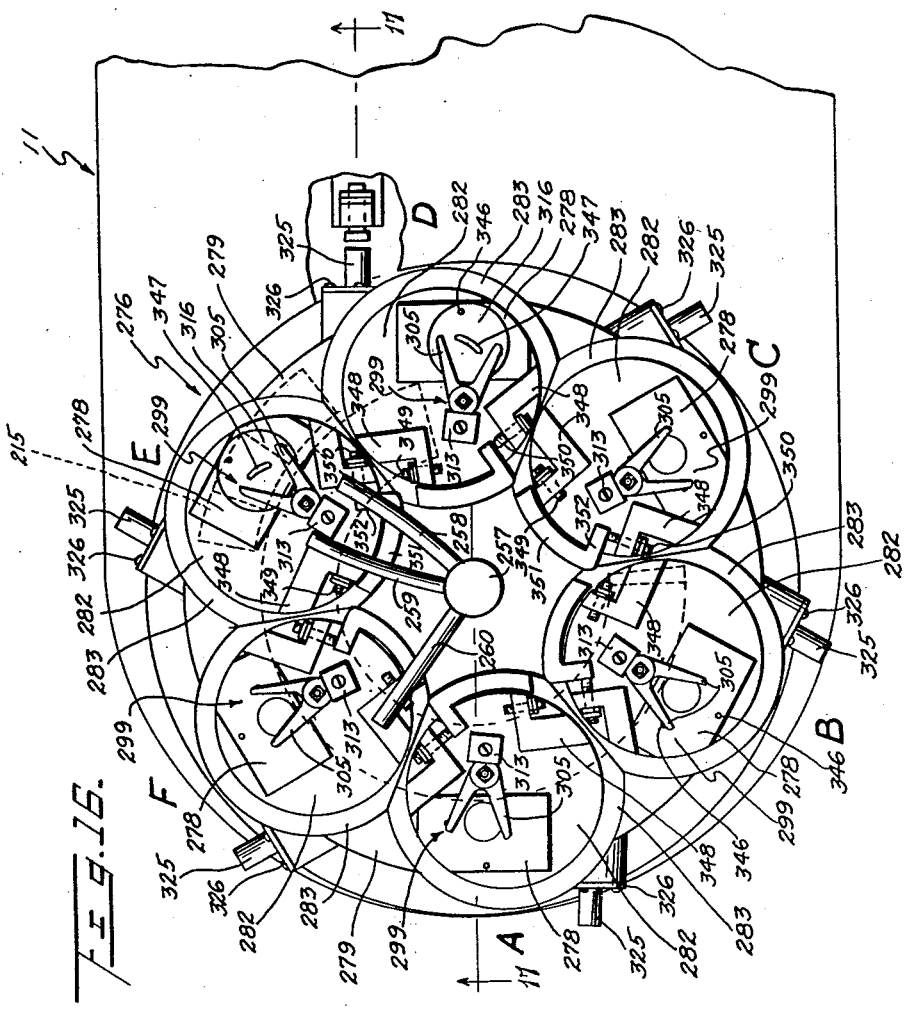
Fig. 17 is a vertical sectional view taken as along the plane of the line 17—17 of Fig. 16.

Opening 291 through the plug 282 is concerned with the mounting and operation of a work clamping means generally designated 299 and corresponding exactly with the work clamp 228 of Figs. 1 through 15. Work clamp 299 comprises an inner member 300 vertically movable in the opening 291 and at its inner end carrying a roller 301 adapted to ride up onto the cam 219 at the proper times. Member 300 includes a reduced diameter upwardly extending tubular portion 302 telescopingly received in the lower tubular portion 303 of the actual work clamping part 304 which at the upper side of the block 278 comprises a pair of fingers 305 as best shown in Fig. 16. A rod 306 passes longitudinally through the member or part 304 and has its lower end 307 threaded into the part 302.

Shoulder 308 on the rod 306 is clamped against the bottom wall of the part 304 on tightening of a nut 309 on the outer end of the rod. Pin 310 passes through the tubular part 302 and enters slots 311 in the tubular part 303 to prevent relative turning of these parts. With the described construction it will be clear that on loosening of the nut 309 the rod or screw 306 may be turned to draw the parts 300 and 304 toward one another or to move such parts from one another whereby to increase or decrease the telescoping relation between the portions 302 and 303 and thereby decrease or increase the effective length of the stem portion of the work clamp 299.

Back edge 312 of the part 304 is flatted and a block 313 is secured by a screw or the like 314 to the top side of the plug 282 in position to have said flat side 312 ride against a flat of the block in all positions of the part 304 whereby turning of the latter about its own longitudinal axis is prevented. A coil spring 315 in the opening 291 and about the tubular portion 302 bears at its lower end against part 300 and at its upper end against a portion of the plug 282. This spring constantly urges the part 300 downwardly or inwardly of the plug and thus is constantly tending to hold the clamping fingers 305 toward and against the work 316 on the holder 278.

The work holders 278, the ejectors and the work clamps being mounted on the plugs 282 it will be understood that all such parts are turnable with the plugs as the latter are turned in the cylinders 281. Fast on the plug body 287 approximately midway the ends thereof is a ring gear 317. This ring gear is located opposite the thickened wall portion 284 of the cylinder 281 and therefore is between the upper and lower bearing means 285 and 286 respectively. Meshing with the teeth 318 of the gear 317 are the teeth 319 of a rack 320.

Figure 18:
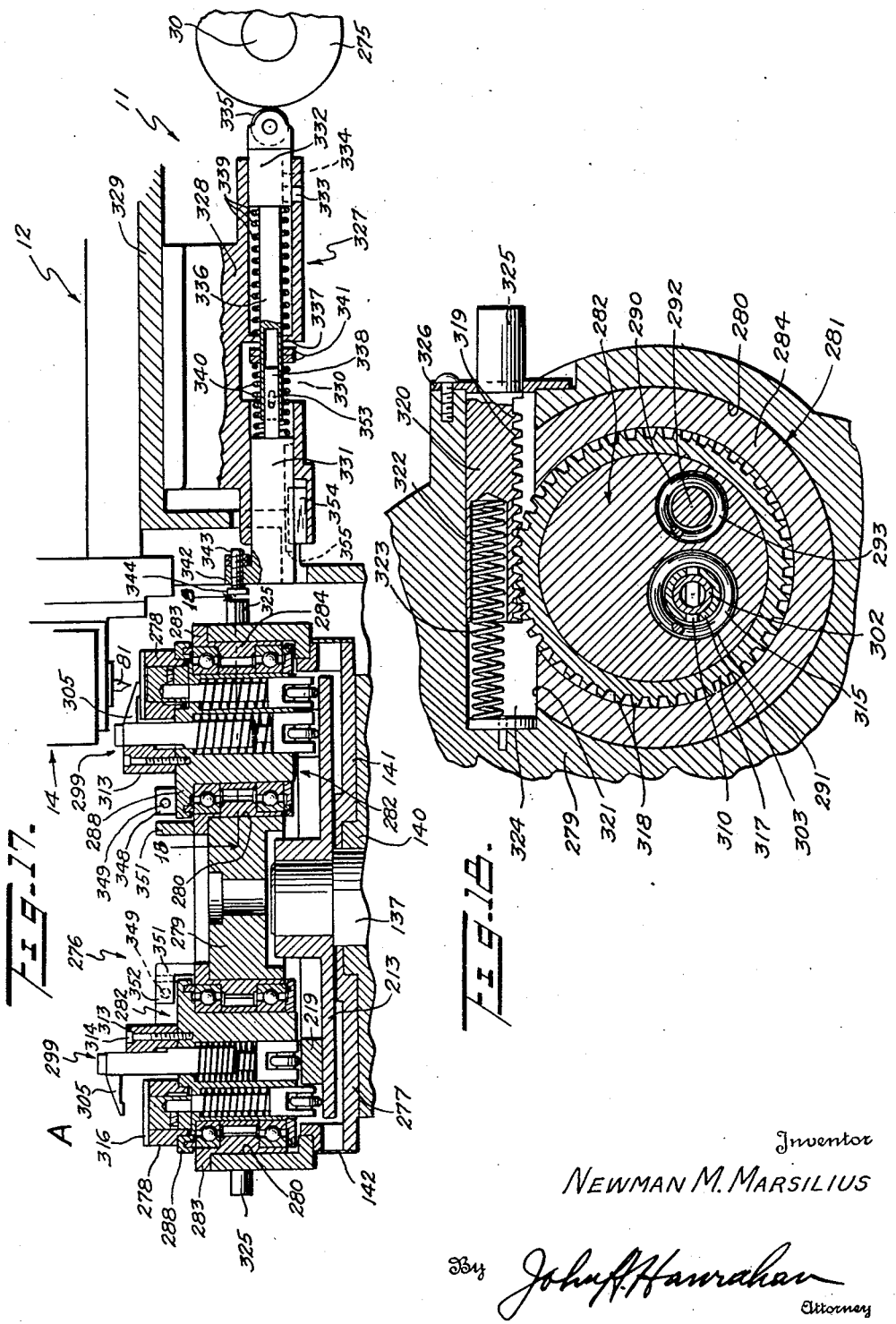
Fig. 18 is a horizontal sectional view on an enlarged scale taken as along the plane of the line 18—18 of Fig. 17.
Figure 19:
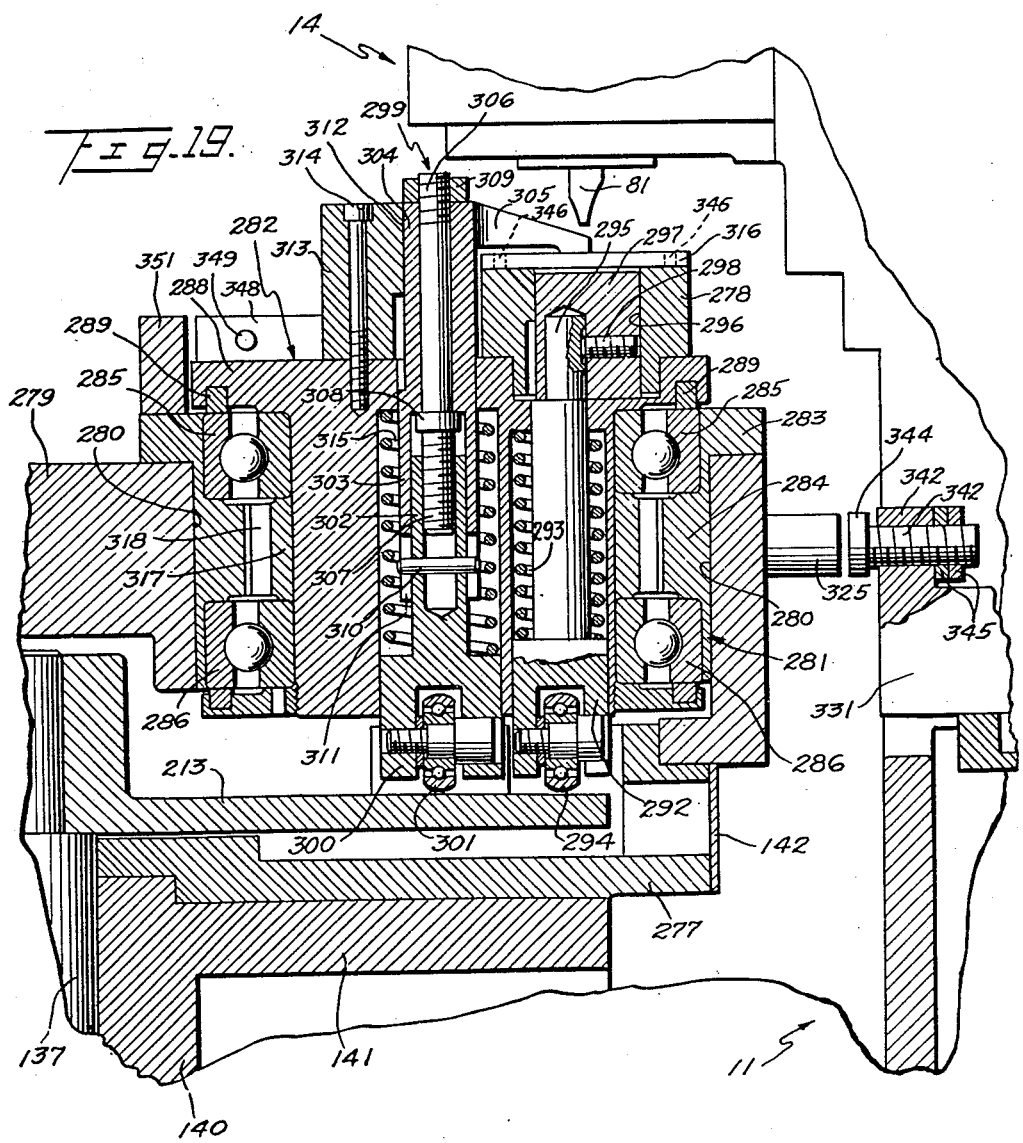
Fig. 19 is a further enlarged vertical sectional view through one of the work holding means of the turret.

To accommodate this rack a portion of the cylinder 281 is cut away as shown at 321 in Fig. 18 and the rack includes a hollow body portion 322 into which enters a portion of a coil spring 323 received with the rack in a recess or socket 324 provided in the main block 279 of the turret. The rack 320 includes a reduced diameter extension 325 passing through a plate 326 secured to the block 279 and which plate in addition to being removable to permit of the insertion and replacement of the rack and the spring 323 also limits movement of the rack outwardly of the socket 324 under the influence of the spring 323.

The six work holders of the turret are all mounted in the manner above described and each of the plugs 282 is provided with one of the gears 317 and associated with each such gear is one of the racks 320. At the station D where the work 316 is engaged by any tool 81 the plug 282 and all parts carried thereby including the work are given a turning movement. The means for this purpose in addition to the parts already described comprises an operating plunger generally designated 327 mounted in a cylinder or housing 328 suspended from the top wall 329 of the bed 11 and having a cutout 330 intermediate its ends. Plunger 327 includes a forward part 331 and a rear part including a head 332 held against turning movement in the housing 328 by means of a pin 333 in such housing and entering a slot 334 in the head.

Beyond the rear end of the housing 328 the head 332 carries a roller 335 riding on the cam 275 before mentioned. Forwardly of head 332 the rear plunger part includes a reduced diameter portion 336 which passes through a wall 337 of the housing 328 and has a hollow open end telescopingly receiving the rear reduced diameter extension 338 of the plunger part 331. A coil spring 339 surrounds the plunger part 336 and at one end bears against the head 332 and at its other end against the wall 337 and constantly urges the rear plunger part in a direction to maintain the roller 335 on the cam 275.

A second coil spring 340 surrounds the reduced portion 338 of part 331 and at its forward end bears against part 331 and at its rear end bears against a nut 341 adjustable on portion 336 whereby to vary the tension of such spring 340. An upstanding lug 342 on the extreme forward end of the plunger part 331 has a shank 343 threaded therethrough and such shank at its forward side is provided with a head 344 into alignment with which the reduced ends 325 of the racks 320 are successively brought as the turret 276 is indexed. It will be clear that the shank 343 is adjustable through the lug 342 and that it is to be secured against casual movement on tightening of the binding nuts 345.

In the operation of the machine provided with the modified structure just described the operator usually stands at station A and there feeds the work 316 to the work-holders 278. These work holders on their upper sides are provided with three locating pins 346 and the work is provided with holes for the reception of these pins whereby the work is always placed properly on the holders. At station A and in fact at stations E, F, A and B the clamping fingers 305 are elevated off the work as the roller 301 of each clamp is on the cam 319 at each of said stations.

As the work leaves station A and passes through station B and approaches station C the roller 301 leaves the cam 319 and the spring 315 brings the fingers 305 onto the work to clamp it against its holder 278. At station D the tool 81 is lowered into the work by the means described in detail when specifically considering Figs. 1 through 15 but is not advanced across the work as slide 12 is not fed horizontally when the present turret is used. As the tool 81 engages the work the cam 275 is advanced so that its higher portion engages the roller 335 and the plunger 327 is advanced so that the screw head 344 engages the reduced rack end portion 325 moving the rack inwardly of the socket 324.

Since the teeth of the rack are meshed with those of the gear 317 and the latter is fast to the plug 282 such plug is given a turning movement. The work is thus given a turning movement and as the tool is at such time engaging the work a cut on a radius is made. Such a cut is shown at 347 on the finished piece of work 316 shown at stations D and E in Fig. 16. When the cut is completed tool-head 14 is raised by the weight 118a. At the same time the high point of cam 275 recedes from the roller 335 and the spring 339 and spring 340 withdraw the plunger 327 to normal position keeping the roller against the cam 275.

Spring 323 also acts when plunger 327 is withdrawn and returns the rack 320 to its normal position thus rotating the plug and returning it and the parts thereon to their normal positions. Thereafter the turret is advanced another step and the completed work is brought to station E. At such station the roller 301 has again mounted onto the cam 219 and the roller 294 has entered onto the cam 315 so that the clamping fingers are off the work and the ejector head 297 is holding the completed work up off the locating pins 346. Now a blast of air from the tubes 258 and 259 blows the work off the ejector head. The turret is advanced another step and at station F a blast of air from tube 260 clears the holder 278 of chips or the like.

On the upper side of each plug 282 are a pair of raised bracket-like members 348 carrying stop screws 349 and 350 respectively. Fixed to the flange 283 of each of the cylinders 281 is a body 351 having a lug-like portion 352 extending over the upper surface of the respective plug in such cylinder and entering between the stop screws 349 and 350 of such plug. As a plug is given a turning movement by the rack 320 in the manner above described the stop screw 349 is brought into engagement with the lug 352 and positively limits such turning movement of the plug and the work carried by the holder 278 on such plug.

Obviously the screws 349 and 350 may be adjusted toward and from one another. When the high point of cam 275 recedes from roller 335 and the plunger 327 is withdrawn spring 323 returns the rack 320 to normal position and such return movement of the rack is limited by engagement of screw 350 with the stationary stop lug 352. With this arrangement it will be clear that the amount of turning movement imparted to the work while the latter is engaged by the tool may be carefully adjusted and will be the same for each piece of work treated. The construction of plunger 327 permits of the full movement of the work each time work is presented to the tool of the machine.

Cam 275 has a rise greater than the actual movement to be imparted to the work. Thus each time the plunger 327 is operated by the cam the rear part 332 of the plunger is given an excessive movement but it will be understood that the movement of plunger part 332 is imparted to plunger part 331 only through the coil spring 340. Thus as plunger part 332 advances the nut 341 is advanced compressing spring 340 in excess of the compression of coil spring 323 in the rack so that the forward plunger part 331 is advanced and advances the rack. When the stop screw 349 engages the stop 352 the plunger part 332 continues to advance but such movement results only in further compression of the springs 339 and 340. In this way due to the fact that an overthrow movement is imparted to the plunger 327 there is assurance that a full movement will always be given the rack 320 and thus the work. Due to the fact that the stop screws 349 and 350 are provided the work is, in each instance, given exactly the same movement thus insuring uniform product. A pin and slot connection 353 between the plunger parts 336 and 338 presents separation of such parts and a key 354 in the casing 328 enters a keyway 355 in the plunger part 331 and holds the same against turning about its longitudinal axis so that head 344 is always properly positioned.

The modified turret structure of Figs. 20, 21, 22 and 23 is designed for the milling of an arc and while the principle is the same as that employed in the form shown in Figs. 16 through 19 the structure is different. In Figs. 20 through 23 many of the parts are the same as those employed in the figures previously described and where such is the case the parts have been given the reference numbers first attached to them in order to simplify the description.

Referring in detail to Figs. 20 through 23 the improved turret there shown is generally designated 360 and comprises a main body or block 361 mounted on the turret base 277 carried by the flange portion 141 of the sleeve 140 above described in detail. The turret body is spaced above the stationary cam plate 213 carried by or mounted on the stationary post 137 and carrying the cams 215 and 219. Turret 360 is to be indexed through the six stations A, B, C, D, E and F above described.

Essentially the difference between the forms of Figs. 16 through 19 and Figs. 20 through 23 resides in the fact that while the work holder in the latter figures is given a turning movement in order that the radius cut may be made the work clamp as a unit is not so turned. However it includes a work engaging part mounted for turning movement with the work when a radius cut is being made. Thus the work clamp generally designated 362 in Figs. 20 through 23 is similar to the clamp generally designated 299 in Figs. 16 through 19 and where the parts are the same they have been given the same reference characters.

The upper or outer end portion of the work clamp 362 in place of the fingers 305 of clamp 299 comprises an arm 363 in the outer end of which is rotatably mounted a spindle or stem 364 carrying at its lower end a work engaging head 365. Suitable bearings 366 mount the stem 364 whereby the same is readily rotatable in the outer end portion of arm 363 and this stem and its head comprises a live center for work as will appear.

All of the six means for supporting the work and for turning it while it is being engaged by the tool 81 are alike and a detailed description of one will therefore apply to all. In an opening 367 extending through the body 361 (it will be understood that there are six of these openings and that the means in said openings and to be described are all alike) is a plug 368 comprising a hollow stem portion 369 and a hollow head 370. Spaced upper and lower bearing means 371 and 372 mount the plug for turning movement relative to the turret body 361.

Within the stem 369 of the plug 368 is a plunger or ejector comprising a lower head 373 mounting a roller 374 for cooperation with the ejector cam 215 on plate 213 as will be understood. A reduced diameter upwardly directed extension 375 of the head 373 is threaded into the lower tubular portion 376 of an ejector head 377 and a binding pin 378 passing through said head and having a portion threaded in the head may be tightened against the stem 375 to lock the parts 373 and 377 against any casual movement.

Pin 380 enters a slot 381 in the head 373 and maintains the plunger against turning movement in the stem portion of the plug 368 but does not interfere with vertical movement of the plunger and ejector head in the plug. A coil spring 382 on the stem of the plug bears against the head 373 and a portion of the plug and constantly tends to draw the plunger and the ejector head downwardly in the plug. Fixed to approximately the mid-portion of the stem 369 of plug 368 is a gear 383, which may have teeth all about it or which may be incomplete as will appear. Meshing with the teeth of the gear 383 are the teeth 384 of a rack 385 located for reciprocating movement in a socket 386 in the block or body 361.

Rack 385 has a socket 387 opening through its inner end and receiving one end portion of a coil spring 388 the other end of which is received in a well 389 at the inner end of the socket 386. Removable plate 390 permits of assembly of the rack and spring in the body 361 and the rack includes an outer reduced diameter end portion 391 passing through such plate. Threaded shank 392 carries a head 393 engaged by the outer end portion of the spring 388 and it will be clear that on adjusting of the screw 392 the pressure exerted by the said spring may be varied.

When rack 385 is forced inwardly against the tendency of the spring 388 the gear 383 will be turned and being fast to the plug 368 a turning move will be imparted to the latter and will result in a turning movement of the work as will appear. The head 370 of plug 368 is in this instance the work holder and has the locating pins 394 on which the work 395 is located. Clearly with this arrangement as the plug 368 is rotated the work will be carried with it.

In the operation of the modified turret type machine the conditions at the stations E, F, A, B, and C are those already described. At work station D the tool 81 is lowered by the cam action previously described but the slide 12 is not advanced horizontally. During engagement of the work by the tool the plunger 327 is operated by the cam 275 with the result that the rack 385 is forced inwardly of the socket 386 in the manner in which the rack 320 (Figs. 16 through 19) was forced into socket 321 as previously detailed. As the plug 368 is turned the work will be turned with it and is being held in place by the live center means 364—365 and during this time the work is being acted on by tool 81 so that a radius cut is made in the work. Clearly the radius of the cut made will depend on the location the tool 81, when engaging the work with respect to the longitudinal center of plug 368 since the latter turns about its own center.

After a piece of work has been finished it is carried to station E and raised off holder 370 and locating pins 394 when the roller 374 rides onto the ejector cam 215 and the ejector head is raised from its position in the head 370. At the stations E a blast of air delivered through tubes 258 and 259 blows the completed work from the ejector head 377. When the tool has made its cut it is raised by the weight 118a along with the head 14.

In order that the work will in each instance be given exactly the same turning movement the cylinder 367a in the opening 367 has fixed to its outer end a pair of brackets 396 through which pass stop screws 397 and 398 of which the screw 397 is normally engaged by a stop lug 399 on the head 370 of the plug 368. The spring 388 normally maintains the plug in such position that the stop 399 is against stop screw 397 and returns the parts to such relation on their release after having been moved from such position.

When the plug 368 and thus the work 395 are turned to obtain the radius cut during engagement of the work by the tool the turning movement of the plug and work is limited by engagement of the stop screw 398 by the stop 339 on the head of the plug. As the cam 275, provides for an overthrow stroke of the plunger and such excess movement is taken up in the plunger as has been set forth it will be clear that in each operation the full movement of the plug to bring stop 399 against screw 398 will be obtained. A block 400 corresponding with the blocks previously described has a flat side against a flat surface of the clamp 362 and prevents any casual turning thereof so that the live center clamping means 364—365 is always in proper position.

Referring now to the form of the invention shown in Figs. 24 through 27 the machine includes the bed 11, the slide 12 and on the forward end of the latter a tool head generally designated 401. At the forward end of the bed is a turret generally designated 402. Tool head 401 includes a vertical slide 403 the downward movement of which on the horizontal slide 12 is limited as by an adjustable stop screw 404 carried by a bracket 405 on the slide 403 and adapted to engage the top side of the slide 12 as shown in Fig. 24. At its forward side head 401 includes a plate 406 having vertical slots 407 therein and through which pass fastening bolts 408. With this arrangement it will be clear that on loosening of bolts 408 the plate 406 may be adjusted vertically after which the bolts are tightened.

While the bolts are loose the plate 406 is adjusted by the turning of a screw 409 supported by a bracket 410 and adapted when turned to feed the plate 406 upwardly or downwardly depending on the direction in which the screw is turned.

On the front face of plate 406 are a pair of spaced bearings 411 and 412 of which the latter mounts a hollow spindle 413 at its inner end receiving the tapered portion of an arbor 414 also extending into the bearing 411. Between the mentioned bearings the arbor 414 mounts a suitable milling cutter or other tool 415 and the tool is fixed to the arbor as by being keyed thereto as shown at 416.

From the above it will be understood that the tool is firmly mounted and that it may be adjusted vertically relative to the other portions of the tool thread whereby the vertical movements imparted to the latter by the cam and weight means previously described may be made to give more or less of an effective cutting movement or feed to the tool. The tool is driven by an electric motor 417 mounted on a base or plate 418 disposed on the upper side of the slide 12 for movement therewith but also for adjustment relative thereto. Plate 418 is adjustable along the raised guide means 419 on the upper side of the slide and which guide means is embraced at its edges by the portions 420 of the base or plate 418. On the outer end of spindle 413 is fixed a pulley 421 and a belt 422 driven by the pulley 423 of the motor 417 drives such spindle and thus the cutter 415.

Turret 402 comprises the stationary post 137, the sleeve 140 and its disc 141 supporting and through which the turret proper is indexed or otherwise driven all as previously described. A main turret block 424 is mounted on and carried by a support 425 bolted or otherwise secured to the disc 141. In a space between support 425 and the block 424 is a stationary cam plate or disc 426 fixed to and supported by the post 137 and corresponding with the disc 213 previously described but distinguishing therefrom in that the disc 426 flares or tapers downwardly from the post 137.

A series of openings 427 extend upwardly and outwardly through the block 424 at an angle of ninety degrees to the upper surface of cam disc 426. Openings 427 extend at an incline outwardly through the block 424 and on the block at the outer end of each such opening, and normal to the axis thereof, is secured a work holder 428. Work ejectors are mounted in openings 427 and each ejector comprises a stem portion 429 slidable in its opening 427 and at its inner end mounting a cam engaging roller 430. Screws or guide pins 431 entering longitudinally extending slots or grooves 432 in the ejector stem portions 429 prevent any possibility of the ejector turning in the turret block.

Coil spring 433 has its end portions received in sockets 434 and 435 in the work holder and the stem portion of the ejector respectively, this spring normally retains the ejector in retracted position either with its head portion 436 against a shoulder of the block 424 or with its roller 430 against the disc 426 or a cam 437 corresponding with the cam 215 above described. Ejector pins 438 and 439, which may be of different diameters as shown, are carried by the head 436 and are normally disposed in openings in the work holder 428 and are adapted to be projected through such holders to raise the work 440 therefrom as will more fully appear.

As here shown the work 440 comprises a body of relatively thin stock having a raised portion or projection 441 which is to be engaged by the cutter 415. The work holders 428 are arranged at inclines relative to the outer face of the block 424 and hold the work normal to the axis of the openings 427 so that the work part 441 is located in a plane not parallel with that in which the tool 415 is mounted. Thus when the portions 441 are engaged by the cutter they are cut on a bevel so that they are thicker at one edge than at the other as shown best in Fig. 26.

Means are provided for clamping the work 440 against the work holders 428 as the latter are moved into position presenting the work for engagement by the cutter. Such clamping means includes a bracket 442 having an upper bifurcated portion 443 between the arms of which is located a dog or element 444 pivoted to the bracket as on a pin 445 passing through the dog intermediate its ends. Forward portion 446 of the dog 444 is positioned to be engaged with the work 440 and clamp it to the holder 428 when the latter is positioned for engagement of its work by the cutter 415. Coil spring 447 anchored to the bracket 442 is connected with the dog portion 448 rearwardly of the pivot 445 and normally acts to rock the dog about said pivot in a direction to raise the dog portion 446 from any work on the turret.

The dog is located at the work cutting station of the turret and is in clamping position approximately only while the work is being cut. Fluid operated means (compressed air may be used) are provided for moving the dog to clamping position and maintaining it there during the proper times. Thus a cylinder 449 is formed with the bracket 442 although it may be made separate from and attached to the bracket or to any other convenient stationary part of the machine. Head 450 closes the lower end of the cylinder within which is a piston 451 the rod 452 of which extends through a stuffing box 453 at the upper end of the cylinder. Piston rod 452 engages the underside of the rear portion 448 of the dog or element 444.

On the cam shaft 30 is added a cam 454 riding against the upper end of a stem 455 of a valve 456 to which fluid under pressure is supplied from any suitable source. Tubes or pipes 457 and 458 connect the valve 456 with the cylinder 449 at points respectively above and below the piston 451. Cam 454 is so timed in relation to the other cams on the shaft 30 that as the machine is indexed to bring a work holder 428 into position below the cutter 415 valve 456 is opened to supply fluid under pressure through the tube 458 to the lower end of the cylinder 449 whereby to move the piston 451 upwardly and have its rod 452 acting on dog 444 rock the same about the pivot 445 in a manner to force its forward end portion 446 against the work 440 to clamp it onto the holder and hold it against movement while it is being engaged by the cutter 415.

At the end of a cutting operation cam 454 has advanced and valve 456 shifts as its stem is released and fluid under pressure is supplied to tube 457 and thus to the cylinder at the upper side of piston 451 and the fluid is now free to exhaust from the under side of the piston and the latter is moved to retracted position withdrawing its rod 452 from the rear portion of the element 444 and now the coil spring 447 rocks the dog back about its pivot 445 raising its portion 446 off the work and maintaining its portion 448 in contact with the outer end of the piston rod.

While the work is being clamped to a holder 428 by the dog 444 the work is engaged by the tool 415. That is during such time the tool head 401 is lowered and advanced to bring the tool 415 against and then across the work. At the end of a cut the weight and chain means 118a and 119 raises the tool head 401 and then the weight and chain means 128 and 124 moves the slide 12 and the tool head 401 back to their normal positions. During such return movement of the slide 12 and parts thereon the turret is being indexed to bring the next work holder 428 into position for engagement of its work by the tool.

As the new holder is moved into place its work is engaged by the clamping dog 444 and at this time the work last completed has been carried to the next station which is the discharge station. Approaching the discharge station a holder carrying a completed piece of work has the roller 430 of its associated ejector ride onto the cam 437 (which is of the same construction and for the same purpose as the cam 215 above described). When a roller 430 rides up onto cam 437 the whole ejector of said roller is raised against the tendency of its coil spring 433 and the pins 438 and 439 are projected and lift the completed work off or out of the work holder. At this station and at this time a blast of air supplied through pipe 256, manifold 257, and tubes 258 and 259 is delivered against the piece of work on top of the pins 438 and 439 and the work blown from the pins into a chute or receptacle or the like (not shown).

From the above it will be seen that in the modification just described the turret is provided with an ejector means for each work holder on the turret but that there is but one work clamping means and that the latter is located at the cutting or work station of the machine. Thus in a six station machine there are but two stations at which the work holders may not be loaded. Such stations are the cutting station where the clamp is down on the work and the discharge station where the ejector is in projected position and a blast of air is being directed to blow any work from the ejector. While other fluid under pressure may be used for the actuation of the piston 451 it is preferred to use compressed air since a supply of the latter is available for the blowing of finished work from the ejector.

It is noted in Figs. 24 and 26 that the outer surface of the work holders 428 are arcuate or bulged and that the dog 444 has the underside 459 of its forward portion concave. With this construction when the work is a thin piece as shown it is held in curved condition against the holders and the dogs having solid forward portions the part of the work engaged by the cutter or cutters of the machine is exposed beyond the forward end of the clamping dogs or elements. As the work holders are mounted at an incline to the horizontal and as the cutter is moved forwardly over the work in a horizontal plane the work is cut on a bevel.

Figs. 28 and 29 show a variation of work clamping element or dog designated 460 to be used in place of the element or dog 444 when a slot having a bevelled bottom wall is to be cut as with a thin or narrow cutter. Dog 460 has an opening 461 for the passage of the pivot pin 445, and opening 462 to which one end of the coil return spring 447 may be anchored and includes forward and rearward portions 463 and 464 corresponding with the portions 446 and 448 respectively of the dog 444.

The underside of the portion 463 is recessed to receive a contact piece 465 mounted on a pivot 466. A slot 467 extends through both the forward portion 463 of the dog and the forward portion of the contact piece 465 for the passage of a cutting tool into engagement with any work being held or clamped to a work holder by the dog. It is noted that the exposed surface, the lower surface of the piece 465 is flat and is adapted to engage flat pieces of work and clamp them to a flat surfaced work holder.

Figure 30:
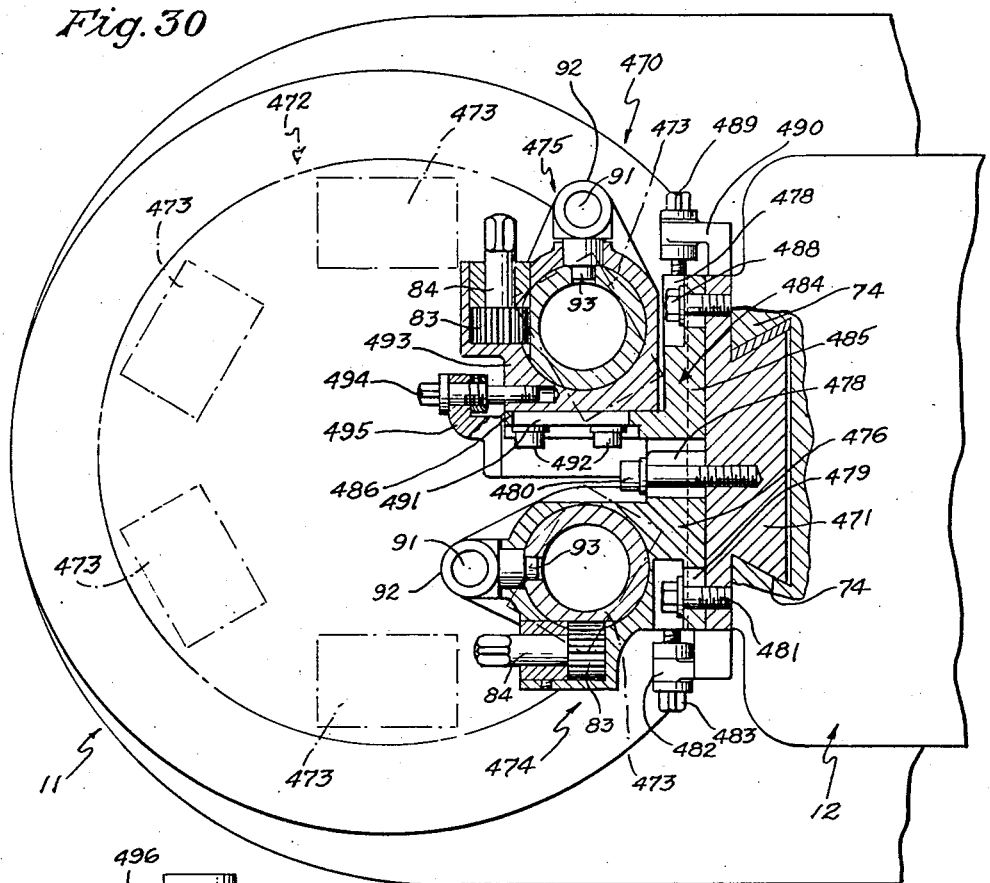
Fig. 30 is a view of the front end portion of a machine equipped with a modified construction of tool head for mounting two tool spindles, the tool head being shown in horizontal section and other parts being shown in top plan.
Figure 31:
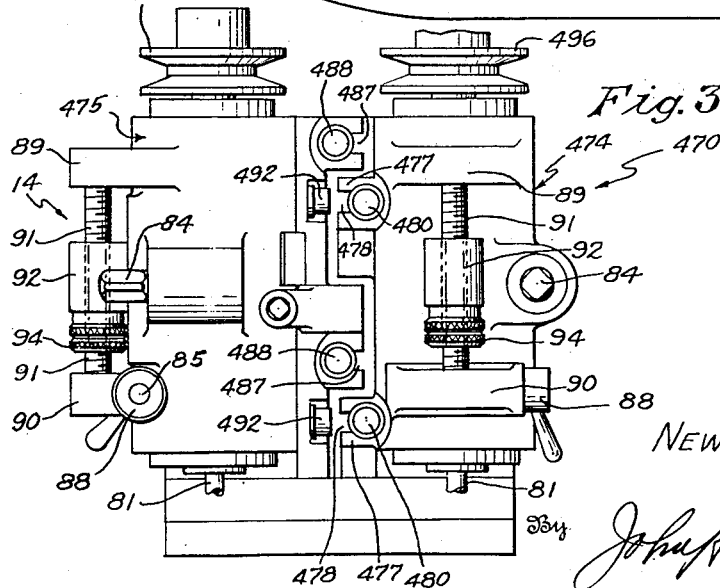
Fig. 31 is a front elevational view of the tool head of Fig. 30.
Figure 32:
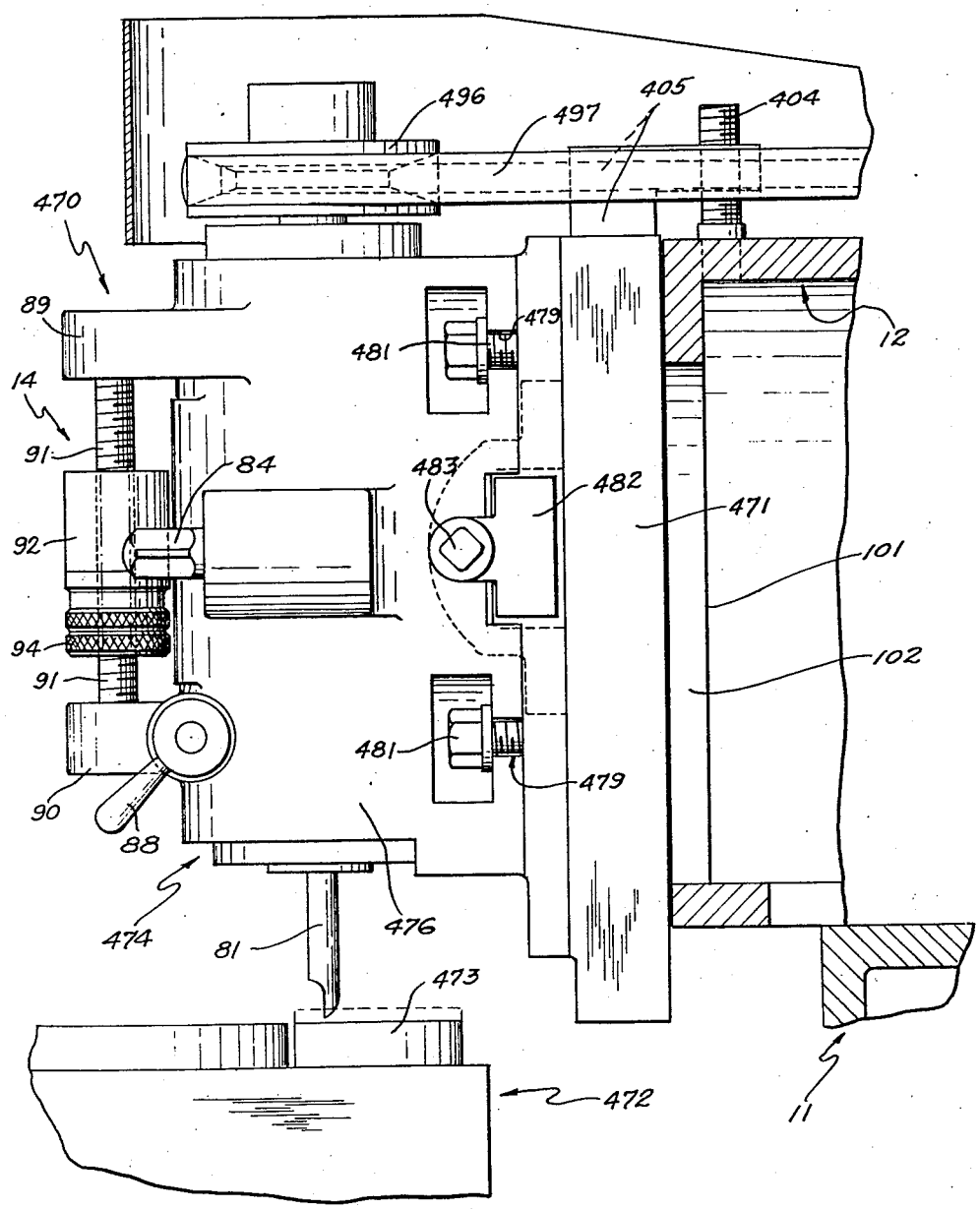
Fig. 32 is a side elevational view of such tool head but on a larger scale.

Figs. 30 through 32 show the machine of the invention equipped with a double or two spindle tool head generally designated 470 and mounted on the forward end portion of slide 12 and equipped with the limiting or stop screw 404 in the bracket 405. The vertical slide 471 of the modified construction is moved vertically in the ways 74 of the slide 12 in the manner and by the means first described and including the cam 34 and the weight 118a and its chain. On the forward portion of bed 11 is a turret generally designated 472 having six equally spaced work holders 473 thereon and the turret may include any of the work ejectors and work clamps heretofore disclosed but where the work clamps are provided only at the work station as in Figs. 24 through 27 two such clamps must be provided as in the present modification two work stations are used. Where the work clamps and ejectors of the type shown in Figs. 1 through 15 are used the ejector cam 215 and the work clamp lifting cam 219 are located on the cam disc 213 in positions to raise the clamps and eject the work at the station following the second cutting or work station.

On the forward side of the slide 471 are a pair of tool holders or tool mounts 474 and 475 respectively. Mount 474 comprises a body 476 secured to the slide 471 for horizontal adjustment relative thereto. To such end body 476 is provided with lateral ears 477 having slots 478 therein and the body is further provided with horizontal slots 479. Bolts 480 are passed through the pair of slots 477 and similar but shorter bolts 481 pass through the pair of slots 479 and it will be clear from Fig. 30 that all of said bolts are threaded into the slide 471.

At one edge slide 471 carries a bracket 482 through which is threaded a micrometer screw 483 threaded into the body 476. With this construction it will be understood that on loosening of the bolts 480 and 481 the body 471 may be adjusted horizontally on the slide 471 by turning of the screw 483. Within the forward portion of the body 476 is the quill 78 previously described and the said quill contains a tool spindle, is vertically adjustable in the said body through the use of the gear 83, the lug 92 and nut 94, and is held in adjusted position by the pinch bolt 85 and its nut 88 all as previously described.

Mounting 475 comprises an L-shaped bracket generally designated 484 and including portions or arms 485 and 486 of which the first is against the forward face of the slide 471 while the latter extends forwardly from said face in slightly spaced relation to the body 476. Upper and lower pairs of horizontal slots 487 in the bracket 484 receive bolts 488 threaded into the slide 471 and adapted to be loosened to permit of horizontal adjustments of the bracket on the slide 471 when a micrometer screw 489, supported by a bracket 490 on an edge of the slide, is adjusted.

Bracket arm 486 has upper and lower horizontally extending slots 491 receiving bolts 492 threaded into a body 493. A micrometer screw 494 threaded through a bracket 495 is threaded into the body 493 and it will be clear that on loosening of the bolts 492 and turning of the screw 494 the body 493 may be adjusted toward and from the slide 471 independent of any adjustment of the body 476. Body 493 mounts one of the quills and the means for adjusting the same and securing it in adjusted positions and as these parts have all been previously described and their respective functions fully set forth and further description of them is believed unnecessary. Pulleys 496 on the upper ends of the tool spindles are driven as through belts 497 from a motor (not shown) on the top of the slide 12.

When turret 472 carries six work holders the tool spindles of this double or dual spindle machine are arranged sixty degrees apart and may be provided with similar or different tools as desired. The tool head 470 is moved with and relative to the slide 12 by the means and in the manner first described for moving tool head 14 and the turret may be indexed one station at a time or two stations as desired by the indexing means herein previously disclosed. Attention is directed to the fact that the tool mounts 474 and 475 may be adjusted relatively forwardly and rearwardly through the use of the bolts 492 and slots 491 in combination with the screw 494. That is body 493 may be adjusted on the bracket arm 486 relative to the body 476 and it will be clear that the latter may be adjusted relative to the turret by adjusting the horizontal rack bar 61 previously described in connection with the horizontal movement of the slide 12.

It will now be clear that the invention comprises several features which may be used in milling or other machines. The turrets disclosed may be used with either vertical or horizontal spindle cutters depending on the work to be performed.

Having thus set forth the nature of my invention, what I claim is:

1. In a machine, a turret, a plurality of work holders on said turret, a normally retracted ejector associated with each work holder, a work clamp associated with each work holder and normally in clamping relation therewith, means mounting said work clamps in fixed radial relation to said work holders but for limited reciprocating movement relative thereto, said means including a flat on each clamp and a block fixed on said turret and bearing aganst said flat, means for imparting turning movement to the turret, and stationary cam means operable to move said work clamps to released positions and move said ejectors to projected positions to move the work from the respective work holders in a predetermined position of the turret.

2. In a machine, a vertical stationary post, a turret, means at the outer side of said post mounting said turret in horizontal position for turning movement, means intermediate the ends of the post for imparting such movement to said means and thereby to the turret, a plurality of work holders on the turret and each having a vertical opening therethrough, an ejector in each such opening, a cam engaging roller at the inner end of each ejector, a coil spring associated with each ejector and normally retaining it in retracted position, a work clamp associated with each holder, said clamps each comprising a clamping portion for clamping work to its holder, a stem portion passing vertically through said turret, a cam engaging roller on the inner end of said stem, a coil spring associated with each stem and normally urging it in a direction to bring its clamping portion into clamping relation with work on its holder, a stationary horizontally disposed cam plate on the upper end of said post and located below said turret, stationary cams on said plate and adapted to be engaged by said rollers, and said cams positioned to be engaged by the second and first mentioned rollers to raise the clamping means and the ejector against the action of said coil springs to release and eject work from the holders as the latter are brought into predetermined positions during movements of the turret.

3. In a machine, a horizontal work support, a plurality of work holders on said support, work locating pins on the upper sides of said holders, a tool, means to move said support in a horizontal plane to present said work holders to the tool for action of the latter on work in the holders, each of said holders having a vertical opening therethrough, an ejector means in said opening, means normally maintaining said ejector in retracted position, a work clamp associated with each holder, each of said clamps including a work engaging portion for maintaining work in a holder and a stem passing through the support, means operating on said stems and normally maintaining them in positions with the work engaging portions of the clamps in work clamping relation to the holders, stationary cams at the under side of said support and adapted to be engaged by the work clamps and ejectors, said cams positioned to raise said stems and thus the work engaging portions of the clamps off the work and to raise said ejectors through the holders and lift the work off the locating pins as the work holders are brought into a predetermined position during movements of the support, the stem portions of said clamping means longitudinally adjustable, threaded means for affecting said adjustments, and means extending to and operable from the top side of said turret for turning said threaded means and thereby affecting said adjustments.

4. In a machine, a stationary vertical post, a vertical sleeve about said post, means mounting said sleeve for turning movement, means for imparting turning movement to said sleeve, a hollow turret supported by and turnable with said sleeve, said post having its upper end disposed in said turret, a stationary cam plate supported on said post above said sleeve and within said turret, work holders on said turret, work clamping and work ejecting means carried by said turret and associated with each of said holders, cam means on said cam plate and adapted to be engaged by said work clamping and work ejector means to release and eject the work from its holder, and said cam means located to be engaged by the clamping and ejector means on the turret bringing the latter to predetermined positions.

5. In a machine, a tool head comprising a housing having a vertically extending slot, a tool spindle receiving quill in said housing, a lug rigid with the quill and projecting through said slot, a micrometer screw fixedly supported by said housing and passing through said lug at the outer side of said housing and a nut on said screw at the lower side of the lug and adjustable on the screw, teeth on said quill, a gear meshing with said teeth, means for turning said gear to raise and lower the quill in the housing and move said lug along said screw, and said nut adapted to be adjusted to position on said screw and said gear thereafter adapted to be turned to lower the quill to bring said lug into contact with said nut for locating the quill and the tool spindle therein.

6. In a machine, a tool, a work support, a plurality of work holders on said support, means to move said support to successively present said work holders to the tool, means locking said support against movement while the work holders are presented to the tool, means mounting said work holders for turning movement relative to the support, means to turn said work holders relative to the support while work on the holders is engaged by the tool whereby to have the tool cut the work on an arc, and said last means including means retaining said work holders against movement relative to the support while the latter is in motion whereby the holders present their work to the tool in predetermined positions of the holders in the support.

7. In a machine, a tool, a work support, a plurality of work holders on said support, means to move said support to successively present said work holders to the tool, means locking said support against movement while the work holders are presented to the tool, means mounting said work holders for turning movement relative to the support, means to turn said work holders relative to the support while work on the holders is engaged by the tool whereby to have the tool cut the work on an arc, said last means including means retaining said work holders against movement relative to the support while the latter is in motion whereby the holders present their work to the tool in predetermined positions of the holders in the support, work ejectors carried by said support and associated one with each of said work holders, springs normally retaining said ejectors in retracted postions, and stationary cam means under said support and adapted to move said ejectors to projected positions as the respective work holders are brought to predetermined positions during movement of the support whereby to remove work from the holders.

8. In a machine, a tool, a work support, a plurality of work holders on said support, means to move said support to successively present said work holders to the tool, means mounting said work holders for turning movement relative to the support, a gear fixed to each work holder mounting means, a rack meshing with each gear, a spring normally retaining said rack and said gear and work holder mounting means stationary in predetermined positions relative to the support, and means independent of said support for imparting a stroke to said rack in opposition to said spring to impart turning movement to the gear and work holder and work thereon while the latter is engaged by the tool whereby to have the work cut on an arc.

9. In a machine, a tool, a work support, a plurality of work holders on said support, means to move said support to successively present said work holders to the tool, means locking said support against movement while the work holders are presented to the tool, means mounting said work holders for turning movement relative to the support, a gear fixed to each work holder mounting means, a rack meshing with each gear, a spring normally retaining said rack and gear and work holder mounting means stationary in predetermined positions relative to the support, means independent of said support for imparting a stroke to said rack in opposition to said spring to impart turning movement to the gear and work holder and work thereon while the latter is engaged by the tool whereby to have the tool cut the work on an arc, said last means comprising a cam and a plunger between the cam and the rack, said cam adapted to give excessive movement to said plunger to insure a full stroke being given the rack, and said plunger including a spring structure whereby the plunger yields and absorbs the excessive movement offered by the cam when the rack has imparted predetermined movement to the means mounting the work holder.

10. The machine as in claim 8 including adjustable stop means determining the normal positions in which the springs maintain the work holders and their mounting means and the length of a stroke imparted to said rack and thus the amount of turning of said parts with the work during a cutting operation.

11. In a machine, a disc-like work support, a tool, a plurality of plugs in said support, a work holder on each of said plugs, means for moving said support to bring said work holders one at a time to said tool, a normally retracted work ejector in each of said plugs, a work clamp associated with each of said holders and normally positioned to clamp work to the holders, means mounting said plugs for turning movement in said support, means to impart a turning movement to each of said plugs and thereby its work holder as the latter are presented to the tool to turn the work while it is engaged by the tool for the purpose of making an arcuate cut in the work on the holder, said last means including means holding said plugs stationary with respect to said support during movement of the latter, and stationary cam means to move the work clamp to released position and the ejector to projected position to release and eject work from the holder when the support carries the holder from the tool.

12. In a machine, a frame, a work support on said frame and rotatably movable relative thereto, a tool movable on said frame toward and from said support, a plurality of plugs in said support, a work holder on each of said plugs, means for moving said support to bring said work holders one at a time to said tool, means for moving the tool into and out of engagement with the work on said holders as the latter are brought to the tool, a normally retracted work ejector in each of said plugs, a work clamp associated with each of said holders and normally positioned to clamp work to the holders, said work clamps mounted independent of said plugs, a live center on each of said clamps and engaging work on the holders, means mounting said plugs for turning movement in said support, means to impart a turning movement to each of said plugs and thereby its work holder as the latter are presented to the tool to turn the work while engaged by the tool for the purpose of making an arcuate cut in the work on the holder, and cam means to move the work clamp to released position and the ejector to projected position to release and eject work from a holder when the support carries the holder from the tool.

13. In a machine, a work support, a tool a plurality of plugs in said support, means mounting said plugs for turning movement relative to said support, a work holder on each of said plugs, means for moving said support to bring said work holders one at a time to said tool, a normally retracted work ejector in each of said plugs, a work clamp associated with each of said holders and normally positioned to clamp work to the holders, said work clamps mounted in said plugs for turning movement therewith and with the work support, means to impart a turning movement to each of said plugs and thereby its work holder as the latter are presented to the tool to turn the work while engaged by the tool for the purpose of making an arcuate cut in the work on the holder, and stationary cam means to move the work clamp to released position and the ejector to projected position to release and eject work from a holder when the support carries the holder from the tool.

14. In a machine, a frame, a tool on said frame, a turret on said frame and movable thereon relative to said tool, a plurality of work holders on said turret, a normally retracted ejector in said turret below each of said work holders and each adapted to be projected to move work from its holder, means for moving said turret to present the holders to said tool for operation of the latter on work carried by the former, a work clamp mounted on said frame independent of said turret located adjacent said tool, means for moving said clamp into clamping relation with work on each of said holders as the latter are brought to the tool, means to move the clamp to released position when the tool has acted on a piece of work, and a cam means thereafter operative when the turret is moved to carry a holder away from the tool, to operate the ejector of said holder to remove the completed work therefrom.

15. In a machine, a horizontal bed, a slide horizontally movable forwardly and rearwardly on said bed, a tool on the forward end of said slide, a horizontal turret at the forward end of said bed, a plurality of work holders on said turret, a normally retracted ejector below each of said work holders and each adapted to be projected to remove work from its holder, means for moving said turret to present the holders to the tool for operation of the latter on work carried by the former, means to move said slide horizontally to carry said tool horizontally across work so presented, a work clamp pivotally mounted below said tool at the forward end of said bed, fluid pressure operated means below and operable to rock said clamp into clamping relation with work on each of said holders as they are brought to the tool, a cam controlling said fluid pressure operated means in timed relation with movement of the turret, spring means to rock the clamp to released position when the tool has acted on a piece of work, and means thereafter operative when the turret is moved to carry a holder away from the tool to operate the ejector of said holder and remove the completed work therefrom.

16. In a machine, a horizontal bed, a slide horizontally movable forwardly and rearwardly on said bed, a tool on the forward end of said slide, a turret at the forward end of said bed, a plurality of work holders on said turret, means for moving said turret to present the holders to the tool for operation of the latter on work carried by the former, means to move said slide horizontally to carry the tool across work so presented, a work clamp pivotally mounted below said tool, fluid pressure operated means below and operable to rock said clamp into clamping relation with work on each of said holders as they are brought to the tool, a cam controlling said fluid pressure operated means in timed relation with movement of the turret, and spring means to rock the clamp to released position when the tool has acted on a piece of work.

17. In a machine, a bed, a slide, means mounting said side for horizontal adjustment longitudinally of the bed, a tool head on the forward end of the slide, said head including a mounting plate vertically movable on said slide, a pair of tool mounting bodies on the forward side of said plate, means mounting the first of said bodies on said plate for horizontal adjustment relative thereto in directions transverse to the bed, a bracket supporting the second of said bodies and horizontally adjustable on the plate toward and from the first body, and other means mounting the second of said bodies on said bracket for adjustment therewith and for adjustment thereon toward and from the said plate.

18. The machine as in claim 17 including a tool spindle mounting quill in each of said bodies, teeth on the sides of said quills, gears meshing with said teeth, manual means individual to said gears for turning the same to adjust the quills and the tool spindles vertically in said bodies, and means for securing the quills in adjusted positions.

19. In a machine, a bed, a slide, means mounting said slide on the bed for adjustment longitudinally thereof, a tool head on the forward end of the slide, a pair of tool mounting bodies on said slide, means mounting the first of said bodies for horizontal adjustment in a direction transverse of the bed, an L-shaped bracket having an arm against said slide and extending forwardly therefrom, means securing the first of said arms to the slide for adjustment of the bracket toward and from the first of the bodies, said bracket having horizontal slots in the other of its arms, bolts passing through said slots and securing the second of said bodies to said bracket arm, said bolts adapted to be loosened for movement along said slots to permit of adjustment of the second body on the bracket arm toward and from said slide, and threaded means for so adjusting said second body while said bolts are loosened.

20. The machine as in claim 17 including a tool spindle mounting quill in each of said bodies, teeth on the sides of said quills, gears meshing with said teeth, manual means individual to said gears for turning the same to adjust the quills and tool spindles vertically in said bodies, a micrometer screw on each of said bodies, a lug on each of said quills and through which the respective micrometer screws pass, a nut on each of the screws below its respective lug and against which the latter is brought in adjusting the quills, and means for securing the quills in adjusted positions.

21. In a machine, a stationary vertical post, a vertical sleeve about said post, means mounting said sleeve for turning movement about said post, said post extending through the upper end of said sleeve, a radial disc-like member on the upper end of said sleeve and turnable therewith, a hollow turret supported by said disc-like member and receiving the upper end of said post, work holders on the upper side of said turret, work ejectors in said turret and associated one with each of said work holders, each of said ejectors including a stem-like portion extending to the inner hollow portion of the turret, means normally maintaining said ejectors in retracted positions, a stationary plate-like member secured to the upper end of said stationary post within said hollow turret and disposed in radial relation to the post, and stationary cam means on the upper side of said plate-like member and positioned to be engaged by the stem-like portions of the ejectors in predetermined positions of the turret to operate the ejectors for loosening work from the holders.

22. In a machine, a stationary vertical post, a vertical sleeve about said post, means mounting said sleeve for turning movement, means for imparting turning movement to the sleeve, a turret supported by the upper end of and turnable with the sleeve, work holders on the turret, a stationary cam plate supported by said post above said sleeve and below said work holders, work ejecting means carried by said turret and associated one with each of said holders, cam means on said cam plate and adapted to be engaged by said ejecting means to project the latter and raise work from said holders, said cam means located to be engaged by the ejecting means on the turret bringing the latter to a predetermined position, said post having a vertical passage therethrough, a means mounted by said post and having a passage therethrough to the upper side of said turret and forming a continuation of the passage through said post, and means to direct a blast of air from said passage against work raised from the holders by the ejecting means.

23. In a milling machine, a base, a horizontal bed on said base, a stationary post supported by said base forwardly of said bed, a vertical sleeve about said post, means mounting said sleeve on the base for turning movement about the post, said post extending through the upper end of said sleeve, a radial disc-like member on the upper end of said sleeve and turnable therewith, a hollow turret supported by said member and receiving the upper end of said post, work holders on the upper side of the turret, work ejectors in said turret and associated one with each of said work holders, each of said ejectors including a stem-like portion extending to the inner hollow portion of the turret, means normally retaining said ejectors in retracted positions, a stationary plate-like member secured to the upper end of said stationary post within said hollow turret and disposed in radial relation to the post, stationary cam means on the upper side of said plate-like member and positioned to be engaged by the stem portions of the ejectors in predetermined positions of the turret to operate the ejectors for loosening work from said holders, a slide on said bed and horizontally movable thereon forwardly and rearwardly toward and from the turret, a tool holding head, means mounting said head on the forward end of said slide for vertical movement of the head toward and from the turret, a tool on said head, means for moving said slide horizontally and means for moving said tool vertically on the slide to present the tool to work on said holders and then move the tool from such work, and means for continuously driving said tool independent of the slide and tool head moving means.

24. In a machine, a horizontal bed, a slide horizontally movable forwardly and rearwardly on said bed, a horizontal turret at the forward end of said slide, a plurality of work holders on said turret at an angle to the horizontal with their lowermost edges toward the outer periphery of the turret, a tool, means mounting said tool on the forward end of said slide for horizontal movement therewith, means to index the turret to bring said work holders to the tool, means to feed said slide horizontally to carry the tool horizontally over the upper side of the turret and across the upper side of the work to cut the latter on said angle to the horizontal, and means beyond said turret and below said tool and operative when a holder is brought to said tool to engage the work on said holder and clamp it in position during engagement of the work by the tool without interfering with movement of the cutter across the upper side of the work.

25. In a machine, a horizontal bed, a slide horizontally movable forwardly and rearwardly on said bed, a horizontal turret on the forward end of said slide, a plurality of work holders on said turret at an angle to the horizontal with their lowermost edges toward the outer periphery of the turret, a tool, means mounting said tool on the forward end of said slide for horizontal movement therewith, means to index the turret to bring said work holders to the tool, means to feed said slide horizontally to carry the tool horizontally over the upper side of the turret and across the upper side of the work to cut the latter on said angle to the horizontal, means beyond said turret and below said tool and operative when a holder is brought to said tool to engage the work on said holder and clamp it in position during engagement of the work by the tool without interfering with movement of the cutter across the upper side of the work, a normally retracted ejector beneath each of said work holders, a stationary cam plate beneath said ejectors, and a cam on said plate in position to be engaged by and to raise said ejectors to remove work from the respective holders as the holders are moved away from the tool by indexing of the turret.

26. The machine as in claim 8 including a radial part on each of said work holders, pairs of adjustable stops on said support and associated one pair with each of said parts, and the stops of the respective pairs being located at opposite sides of the part with which they are associated whereby to determine the limit of turning movement imparted to a work holder during a cutting operation.

NEWMAN M. MARSILIUS.